United States Patent
Oi et al.

(10) Patent No.: US 9,355,451 B2
(45) Date of Patent: May 31, 2016

(54) INFORMATION PROCESSING DEVICE, INFORMATION PROCESSING METHOD, AND PROGRAM FOR RECOGNIZING ATTITUDE OF A PLANE

(75) Inventors: Kenichiro Oi, Kanagawa (JP); Hiroyuki Ishiwatari, Kanagawa (JP)

(73) Assignee: Sony Corporation, Tokyo (JP)

(*) Notice: Subject to any disclaimer, the term of this patent is extended or adjusted under 35 U.S.C. 154(b) by 94 days.

(21) Appl. No.: 14/238,978

(22) PCT Filed: Aug. 14, 2012

(86) PCT No.: PCT/JP2012/070677
§ 371 (c)(1),
(2), (4) Date: Feb. 14, 2014

(87) PCT Pub. No.: WO2013/027628
PCT Pub. Date: Feb. 28, 2013

(65) Prior Publication Data
US 2014/0168268 A1   Jun. 19, 2014

(30) Foreign Application Priority Data

Aug. 24, 2011   (JP) .................. 2011-182693

(51) Int. Cl.
*G06T 7/00*   (2006.01)
*G06T 19/00*   (2011.01)
*G06T 11/60*   (2006.01)
*G01C 21/36*   (2006.01)
(Continued)

(52) U.S. Cl.
CPC ............ *G06T 7/004* (2013.01); *G01C 21/3647* (2013.01); *G06F 3/0304* (2013.01); *G06F 3/0346* (2013.01); *G06T 11/60* (2013.01); *G06T 19/006* (2013.01)

(58) Field of Classification Search
None
See application file for complete search history.

(56) References Cited

U.S. PATENT DOCUMENTS

2005/0068293 A1*   3/2005   Satoh et al. .................. 345/158
2006/0227211 A1*   10/2006   Kotake et al. ................ 348/141
(Continued)

FOREIGN PATENT DOCUMENTS

JP   2005-107248 A   4/2005
JP   2006-292417 A   10/2006
(Continued)

OTHER PUBLICATIONS

International Search Report issued Sep. 11, 2012 in PCT/JP2012/070677.
(Continued)

*Primary Examiner* — Mark Zimmerman
*Assistant Examiner* — Vu Nguyen
(74) *Attorney, Agent, or Firm* — Chip Law Group; Pramod Chintalapoodi

(57) ABSTRACT

According to an embodiment of the present disclosure, there is provided an information processing device including a data acquisition unit configured to acquire sensor data indicating the direction of gravity exerted on an imaging device configured to image an image in which a physical space is projected, a decision unit configured to decide a relative attitude of a plane in the physical space with respect to the image based on the sensor data, and a conversion unit configured to perform conversion between a three-dimensional position of a given point on the plane and a two-dimensional position in the corresponding image using the attitude decided by the decision unit.

19 Claims, 23 Drawing Sheets

(51) Int. Cl.
*G06F 3/0346* (2013.01)
*G06F 3/03* (2006.01)

(56) References Cited

U.S. PATENT DOCUMENTS

| | | | |
|---|---|---|---|
| 2009/0245681 A1* | 10/2009 | Kobayashi | 382/275 |
| 2009/0316990 A1* | 12/2009 | Nakamura et al. | 382/173 |
| 2010/0194782 A1* | 8/2010 | Gyorfi et al. | 345/633 |
| 2011/0090252 A1* | 4/2011 | Yoon et al. | 345/633 |
| 2011/0165893 A1* | 7/2011 | Hyung et al. | 455/457 |

FOREIGN PATENT DOCUMENTS

| | | |
|---|---|---|
| JP | 2007-271563 A | 10/2007 |
| JP | 2009-237845 A | 10/2009 |

OTHER PUBLICATIONS

Andrew J. Davison, "Real-Time Simultaneous Localisation and Mapping with a Single Camera", Robotics Research Group, Dept. of Engineering Science, University of Oxford, Bhttp://www.robots.ox.ac.uk/ ~ajd/, ICCV 2003, pp. 1-8.

\* cited by examiner

θ : Elevation
φ : Azimuth

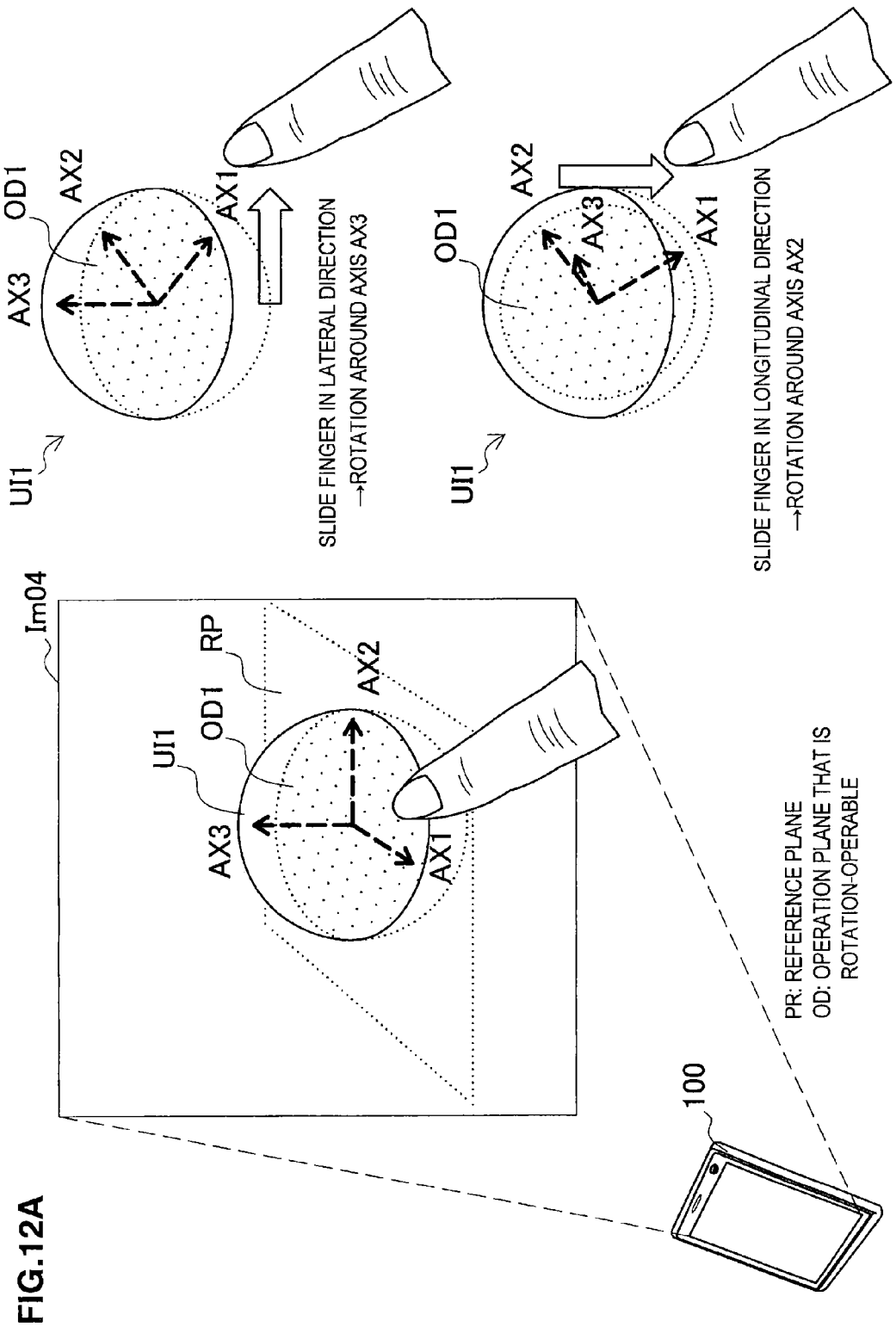

$d_{HP}$ →(KNOWN) REAL SIZE

Ha →(KNOWN) HEIGHT $d_{disp} \rightarrow$ (FIXED) DISPLAY SIZE $d_{disp} \rightarrow$ (USER-DESIGNATED) DISPLAY SIZE

INFORMATION PROCESSING DEVICE, INFORMATION PROCESSING METHOD, AND PROGRAM FOR RECOGNIZING ATTITUDE OF A PLANE

TECHNICAL FIELD

The present invention relates to an information processing device, an information processing method, and a program.

BACKGROUND ART

In recent years, a technology called augmented reality (AR) in which users are presented with a physical space on which additional information is superimposed has been highlighted. Information presented to users in the AR technology is also called an annotation, which can be visualized using virtual objects in various forms such as text, icons, animations, and the like. Such an annotation is disposed in an AR space generally based on recognition of a three-dimensional structure of a physical space projected in an image. As techniques for recognizing such a three-dimensional structure of a physical space, for example, an SfM (Structure from Motion) method, and a SLAM (Simultaneous Localization And Mapping) method are known. In the SfM method, a three-dimensional structure of a physical space projected in a plurality of images imaged while changing perspective is recognized using the images using parallax. Description of the SLAM method is provided in Non-Patent Literature 1 indicated below. Non-Patent Literature 1 indicated below discloses a technique of recognizing a three-dimensional position of a feature point selected during initialization in the SLAM method using the SfM method.

CITATION LIST

Patent Literature

Patent Literature 1: JP 2009-237845A

Non-Patent Literature

Non-Patent Literature 1: Andrew J. Davison, "Real-Time Simultaneous Localization and Mapping with a Single Camera," Proceedings of the $9^{th}$ IEEE International Conference on Computer Vision Volume 2, 2003, pp. 1403-1410

SUMMARY OF INVENTION

Technical Problem

In recognizing a three-dimensional structure of a physical space, generally, a position and an attitude of an object present in the physical space (or the physical space itself) on an imaging plane of an image can be recognized. However, in a technique for image recognition such as the SfM method, there are cases in which it is difficult to attain satisfactory recognition accuracy. Particularly, in a two-dimensional plane in which a change of an image caused by parallax seldom appears (for example, a horizontal plane such as a ground surface, a floor surface, or a ceiling, or a vertical plane such as a wall surface of a building), recognition accuracy of the SfM method easily deteriorates. However, since annotations are disposed in accordance with a plane in many AR applications, an improvement in accuracy in recognizing an attitude of a plane has been strongly demanded in the AR technology above all.

Therefore, the present disclosure proposes a technology that enables further accurate recognition of at least an attitude of a plane in a physical space and the recognized attitude to be used for the AR technology.

Solution to Problem

According to an embodiment of the present disclosure, there is provided an information processing device including a data acquisition unit configured to acquire sensor data indicating the direction of gravity exerted on an imaging device configured to image an image in which a physical space is projected, a decision unit configured to decide a relative attitude of a plane in the physical space with respect to the image based on the sensor data, and a conversion unit configured to perform conversion between a three-dimensional position of a given point on the plane and a two-dimensional position in the corresponding image using the attitude decided by the decision unit.

According to an embodiment of the present disclosure, there is provided an information processing method of a computer configured to control an information processing device, the method including acquiring sensor data indicating the direction of gravity exerted on an imaging device configured to image an image in which a physical space is projected, deciding a relative attitude of a plane in the physical space with respect to the image based on the sensor data, and performing conversion between a three-dimensional position of a given point on the plane and a two-dimensional position in the corresponding image using the decided attitude.

According to an embodiment of the present disclosure, there is provided a program causing a computer configured to control an information processing device to function as a data acquisition unit configured to acquire sensor data indicating the direction of gravity exerted on an imaging device configured to image an image in which a physical space is projected, a decision unit configured to decide a relative attitude of a plane in the physical space with respect to the image based on the sensor data, and a conversion unit configured to perform conversion between a three-dimensional position of a given point on the plane and a two-dimensional position in the corresponding image using the attitude decided by the decision unit.

Advantageous Effects of Invention

According to an embodiment of the present disclosure, it is possible to accurately recognize an attitude of a plane in a physical space and to use the recognized attitude for the AR technology.

BRIEF DESCRIPTION OF DRAWINGS

FIG. 12A is an illustrative diagram showing an example of a user interface for enabling a user to designate an attitude of an arbitrary plane.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In addition, description will be provided in the following order.

1. Overview of a device
2. Details of a first embodiment
2-1. Hardware configuration
2-2. Functional configuration
2-3. Process flow
2-4. Conclusion of the first embodiment
3. Details of a second embodiment
3-1. Functional configuration
3-2. Process flow
3-3. Conclusion of the second embodiment
4. Adjustment of a scale
4-1. First technique
4-2. Second technique
4-3. Third technique
5. Review <1. Overview of a Device>

First, an overview of an information processing device according to the present disclosure will be described using FIGS. 1 and 2.

Figure 1:
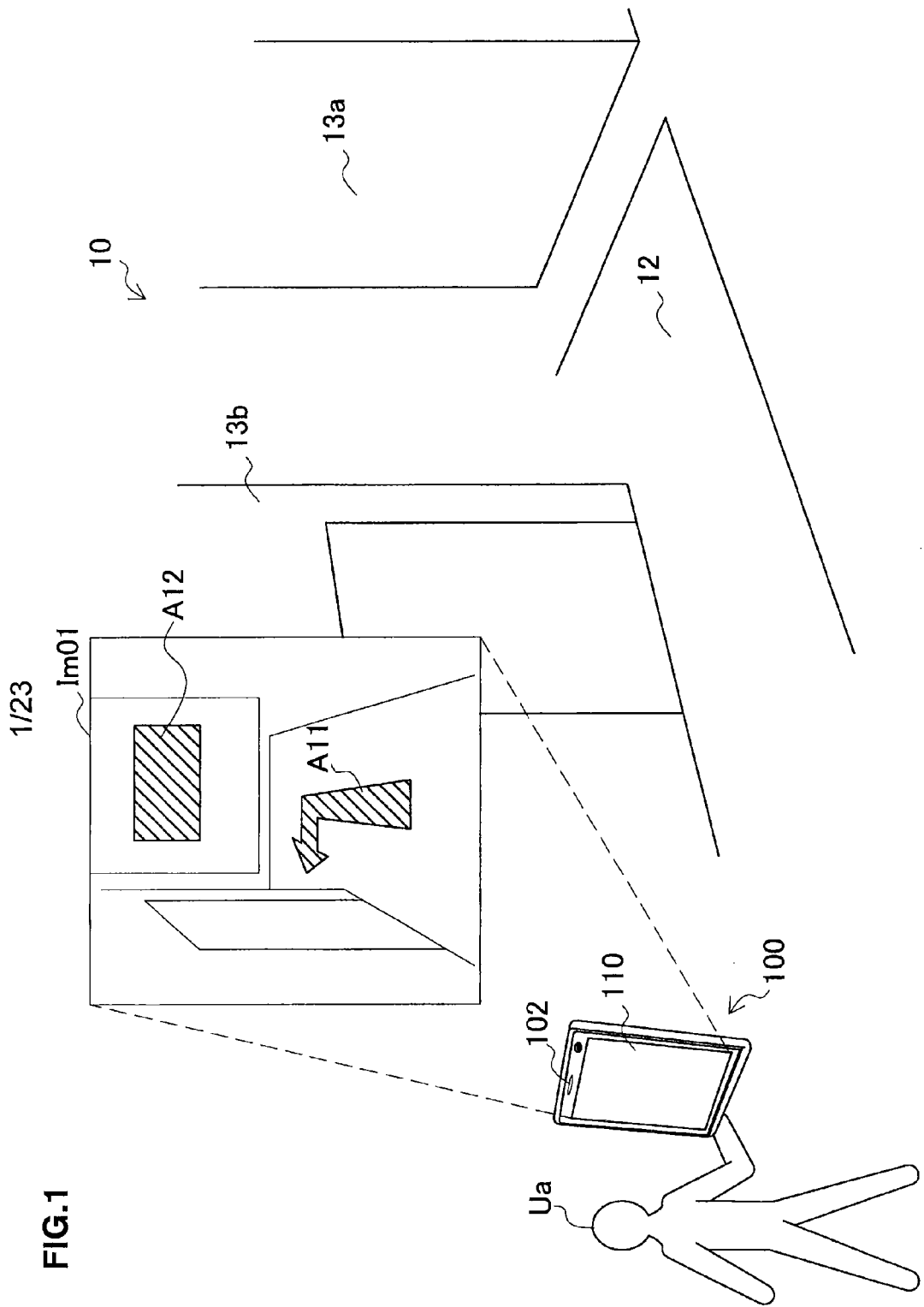
FIG. 1 is a first illustrative diagram for describing an overview of an information processing device according to an embodiment of the present disclosure.

FIG. 1 is a first illustrative diagram for describing the overview of the information processing device 100 according to an embodiment of the present disclosure. Referring to FIG. 1, the information processing device 100 held by a user Ua is depicted. The information processing device 100 has an imaging unit 102 and a display unit 110 facing a physical space 10. In the example of FIG. 1, a road 12, a wall surface 13a of a building, and a wall surface 13b of another building are present in the physical space 10. As an example, the information processing device 100 has an AR application for navigation, and superimposed annotations A11 and A12 for navigation on an image Im01 imaged by the imaging unit 102. The annotation A1 is an annotation in an arrow shape informing a user Ua of a direction, and is disposed on a horizontal plane along the road 12 projected in the image Im01. The annotation A12 is an annotation that provides the user Ua with a given informative message, and is disposed on a vertical plane along the wall surface 13a projected in the image Im01.

FIG. 1 shows a mobile terminal as an example of the information processing device 100. However, the information processing device 100 is not limited to the example. The information processing device 100 may be, for example, a PC (Personal Computer), a PDA (Personal Digital Assistant), a smartphone, a game terminal, a PND (Portable Navigation Device), a content player, a digital home appliance, or the like.

Figure 2:
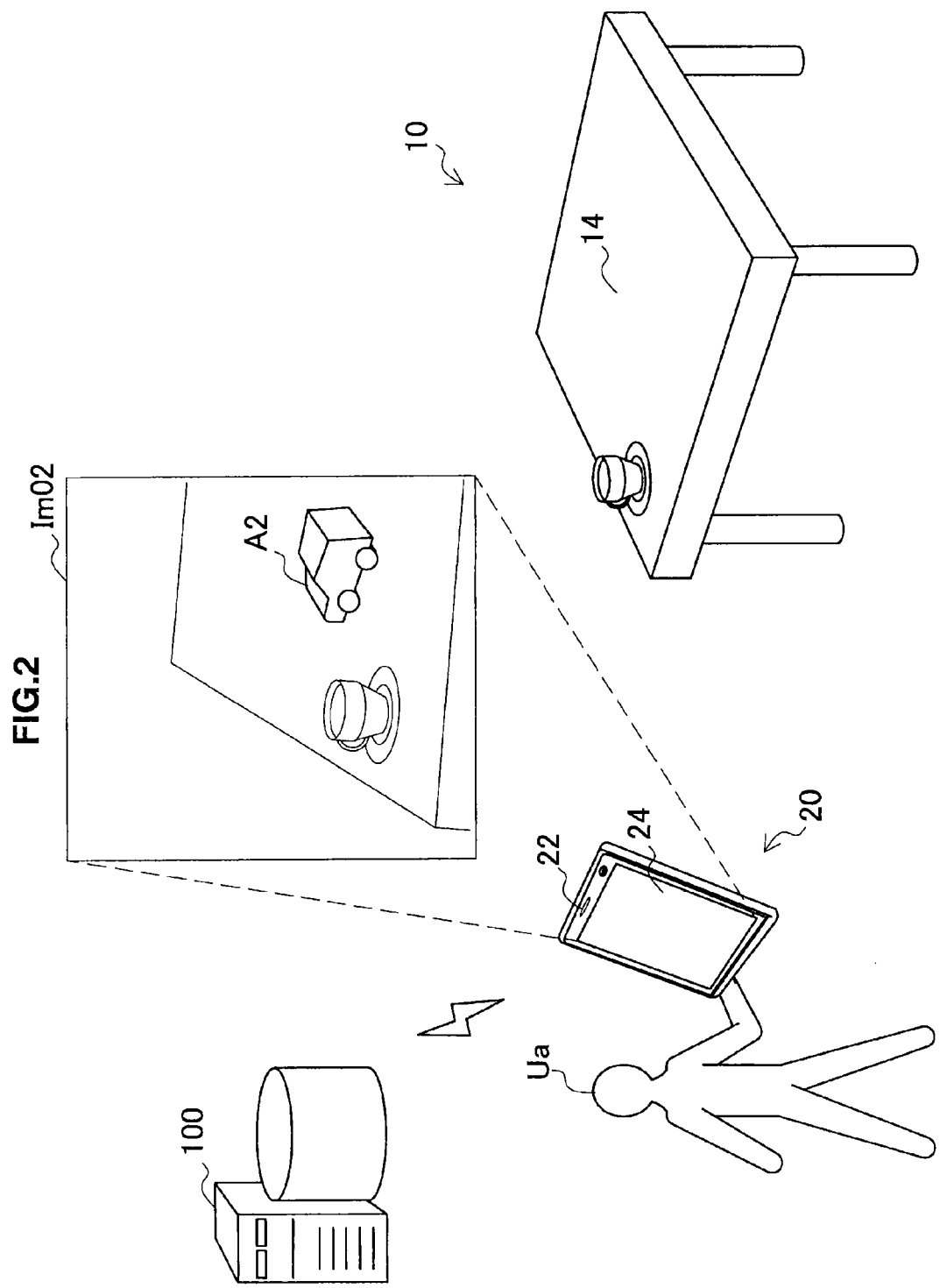
FIG. 2 is a second illustrative diagram for describing the overview of an information processing device according to another embodiment.

FIG. 2 is a second illustrative diagram for describing the overview of the information processing device 100. Referring to FIG. 2, the information processing device 100 is a server device connected to a terminal device 20 held by the user Ua. The terminal device 20 has an imaging unit 22 and a display unit 24 facing the physical space 10. In the example of FIG. 2, a table 14 is present in the physical space 10. The information processing device 100 superimposes an annotation A2 on an image Im02 imaged by the terminal device 20. The annotation A2 is an annotation in a virtual car shape running on the table 14, and is disposed on a horizontal plane along the surface of the table 14 projected in the image Im02.

In order to appropriately dispose the annotations in the AR applications exemplified in FIGS. 1 and 2, it is important to decide a relative attitude of a plane of a physical space with respect to an input image as accurately as possible. However, when an existing technique based on image recognition such as the SfM method is used, it is difficult to attain satisfactory accuracy in recognition with respect to a two-dimensional plane at all times. Selection of a state variable during initialization in the SLAM method significantly affects recognition of a three-dimensional structure of a physical space after the selection, however, when such an existing technique based on image recognition is employed for initialization, a similar problem also arises in accurately recognizing a two-dimensional plane. Thus, as will be described in the following sections through two embodiments in detail, the present disclosure aims to enable an attitude of a two-dimensional plane in a physical space to be more accurately recognized and the recognized attitude of the plane to be used in the AR technology.

<2. Details of a First Embodiment>

[2-1. Hardware Configuration]

Figure 3:
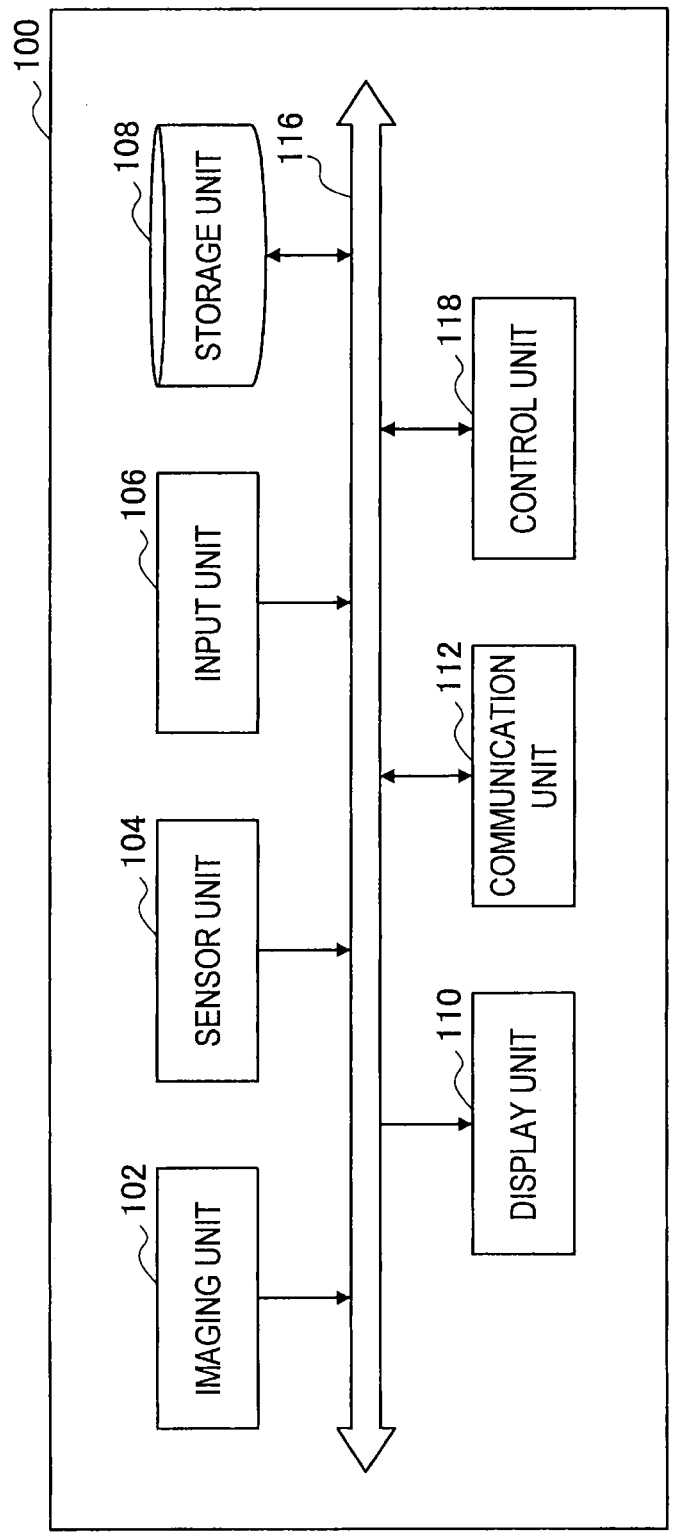
FIG. 3 is a block diagram showing an example of a hardware configuration of an information processing device according to a first embodiment.

FIG. 3 is a block diagram showing an example of a hardware configuration of the information processing device 100 according to a first embodiment. Referring to FIG. 3, the information processing device 100 is provided with the imaging unit 102, a sensor unit 104, an input unit 106, a storage unit 108, the display unit 110, a communication unit 112, a bus 116, and a control unit 118.

(1) Imaging Unit

The imaging unit 102 is a camera module that performs imaging of images. The imaging unit 102 images physical spaces using an image sensor such as a CCD (Charge Coupled Device) or a CMOS (Complementary Metal Oxide Semiconductor), thereby generating imaged images. Such imaged images generated by the imaging unit 102 serve as input images in image processes performed by the control unit 118. Note that the imaging unit 102 may not necessarily be a part of the information processing device 100. For example, an imaging device that is connected to the information processing device 100 in a wired or wireless manner may be treated as the imaging unit 102.

(2) Sensor Unit

The sensor unit 104 can include various sensors used to support decision of an attitude of a plane by the information processing device 100. For example, the sensor unit 104 includes a tri-axial acceleration sensor that measures gravitational acceleration exerted on the imaging unit 102. The tri-axial acceleration sensor measures gravitational acceleration exerted on the imaging unit 102, thereby generating sensor data (acceleration data) that three-dimensionally expresses the magnitude and direction of the gravitational acceleration. Additionally, the sensor unit 104 may also include a geomagnetic sensor that measures a direction of geomagnetism. The geomagnetic sensor generates sensor data (geomagnetic data) that expresses a direction of geomagnetism in a coordinate system of the imaging unit 102. Furthermore, the sensor unit 104 may also include a positioning sensor (for example, a GPS (Global Positioning System) sensor) that measures a position of the information processing device 100. The positioning sensor generates sensor data (positioning data) that expresses longitude and latitude of the information processing device 100 in a physical space. Note that the sensor unit 104 may not necessarily be a part of the information processing device 100.

(3) Input Unit

The input unit 106 is an input device used by a user to operate the information processing device 100 or to input information to the information processing device 100. The input unit 106 may include, for example, a touch sensor that detects a touch of a user on a screen of the display unit 110. Instead (or in addition), the input unit 106 may include a pointing device such as a mouse or a touch pad. Furthermore, the input unit 106 may include another kind of input device such as a keyboard, a key pad, a button, or a switch.

(4) Storage Unit

The storage unit 108 is configured by a storage medium such as a semiconductor memory or a hard disk, and stores programs and data for processes performed by the information processing device 100. The data to be stored in the storage unit 108 can include, for example, captured image data, sensor data, and various kinds of data in a database (DB) to be described later. Note that some of the programs and data described in the present specification may be acquired from an external data source (for example, a data server, a network storage, an external memory, or the like), rather than being stored in the storage unit 108.

(5) Display Unit

The display unit 110 is a display module including a display such as an LCD (Liquid Crystal Display), an OLED (Organic Light-Emitting Diode), or a CRT (Cathode Ray Tube). The display unit 110 is used for, for example, displaying images of an AR application generated by the information processing device 100. Note that the display unit 110 may not necessarily be a part of the information processing device 100. For example, a display device that is connected to the information processing device 100 in a wired or wireless manner may be treated as the display unit 110.

(6) Communication Unit

The communication unit 112 is a communication interface that intermediates communication of the information processing device 100 with another device. The communication unit 112 supports an arbitrary wireless communication protocol or wired communication protocol to establish communication connection with other devices.

(7) Bus

The bus 116 connects the imaging unit 102, the sensor unit 104, the input unit 106, the storage unit 108, the display unit 110, the communication unit 112, and the control unit 118 to one another.

(8) Control Unit

The control unit 118 corresponds to a CPU (Central Processing Unit), a DSP (Digital Signal Processor) or the like. The control unit 118 causes various functions of the information processing device 100, which will be described later, to be operated by executing programs stored in the storage unit 108 or other storage media.

[2-2. Functional Configuration]

Figure 4:
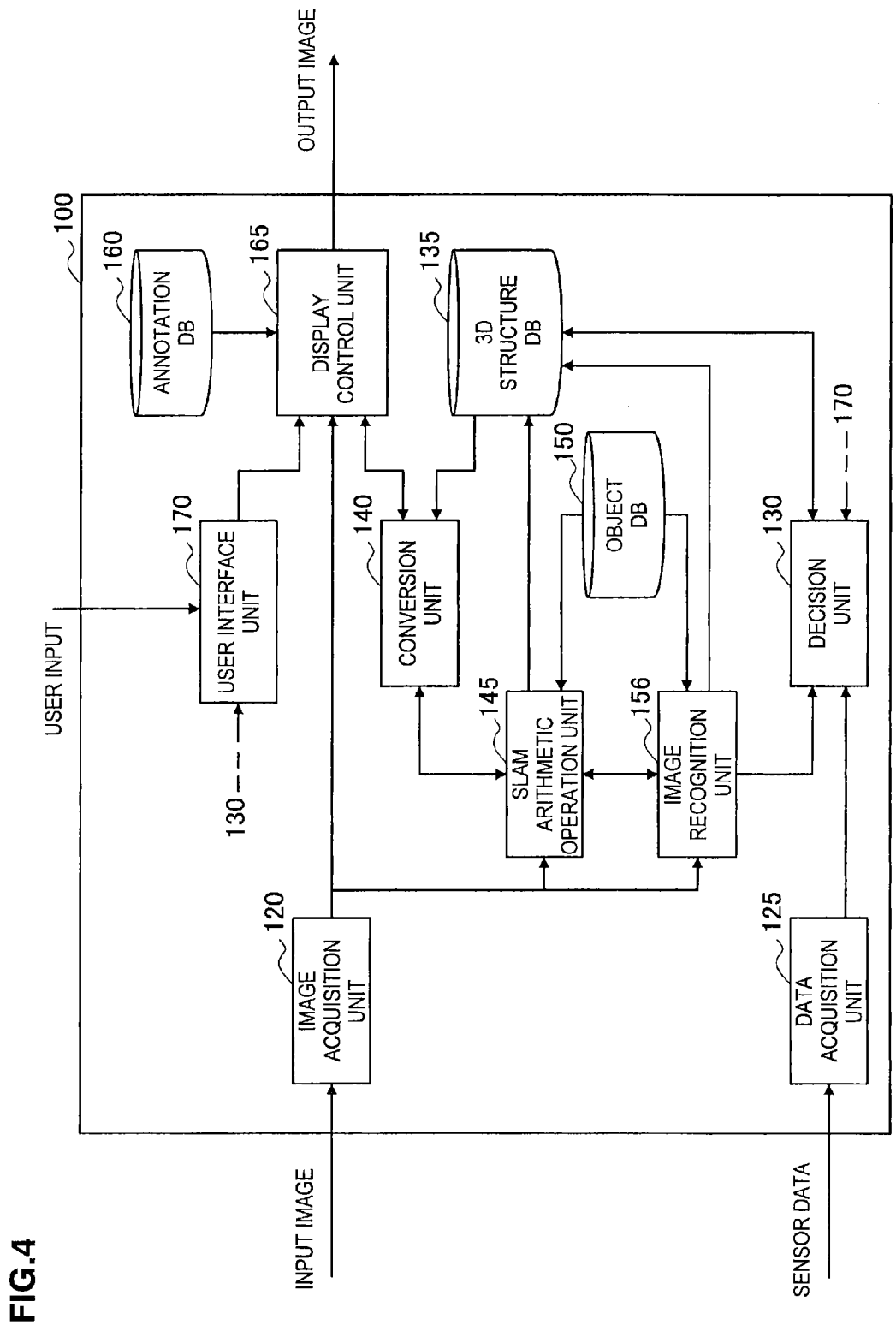
FIG. 4 is a block diagram showing an example of a configuration of logical functions of the information processing device according to the first embodiment.

FIG. 4 is a block diagram showing an example of a configuration of logical functions realized by the storage unit 108 and the control unit 118 of the information processing device 100 shown in FIG. 3. Referring to FIG. 4, the information processing device 100 includes an image acquisition unit 120, a data acquisition unit 125, a decision unit 130, a three-dimensional (3D) structure DB 135, a conversion unit 140, a SLAM arithmetic operation unit 145, an object DB 150, an image recognition unit 156, an annotation DB 160, a display control unit 165, and a user interface unit 170.

(1) Image Acquisition Unit

The image acquisition unit 120 acquires a captured image generated by the imaging unit 102 as an input image. The input image acquired by the image acquisition unit 120 is an image projecting a physical space. The input image may be a still image or each frame constituting a moving image. The image acquisition unit 120 outputs the acquired input image to the SLAM arithmetic operation unit 145, the image recognition unit 156, and the display control unit 165.

(2) Data Acquisition Unit The data acquisition unit 125 acquires data used for a plane decision process performed by the decision unit 130. For example, the data acquisition unit 125 acquires sensor data that can include at least one kind of acceleration data, geomagnetic data, and positioning data generated by the sensor unit 104. In addition, the data acquisition unit 125 may acquire map data of a peripheral region of a position indicated in the positioning data from a database stored by the information processing device 100 in advance or an external data server. Then, the data acquisition unit 125 outputs the acquired data to the decision unit 130.

(3) Decision Unit

The decision unit 130 decides a relative attitude of a plane of a physical space with respect to an imaging plane of an input image based on the sensor data acquired by the data acquisition unit 125. Here, a technique of deciding an attitude of a horizontal plane will be described first in detail, and then deciding attitudes of a vertical plane and other planes will be described.

(3-1) Decision of an Attitude of a Horizontal Plane

Figure 5:
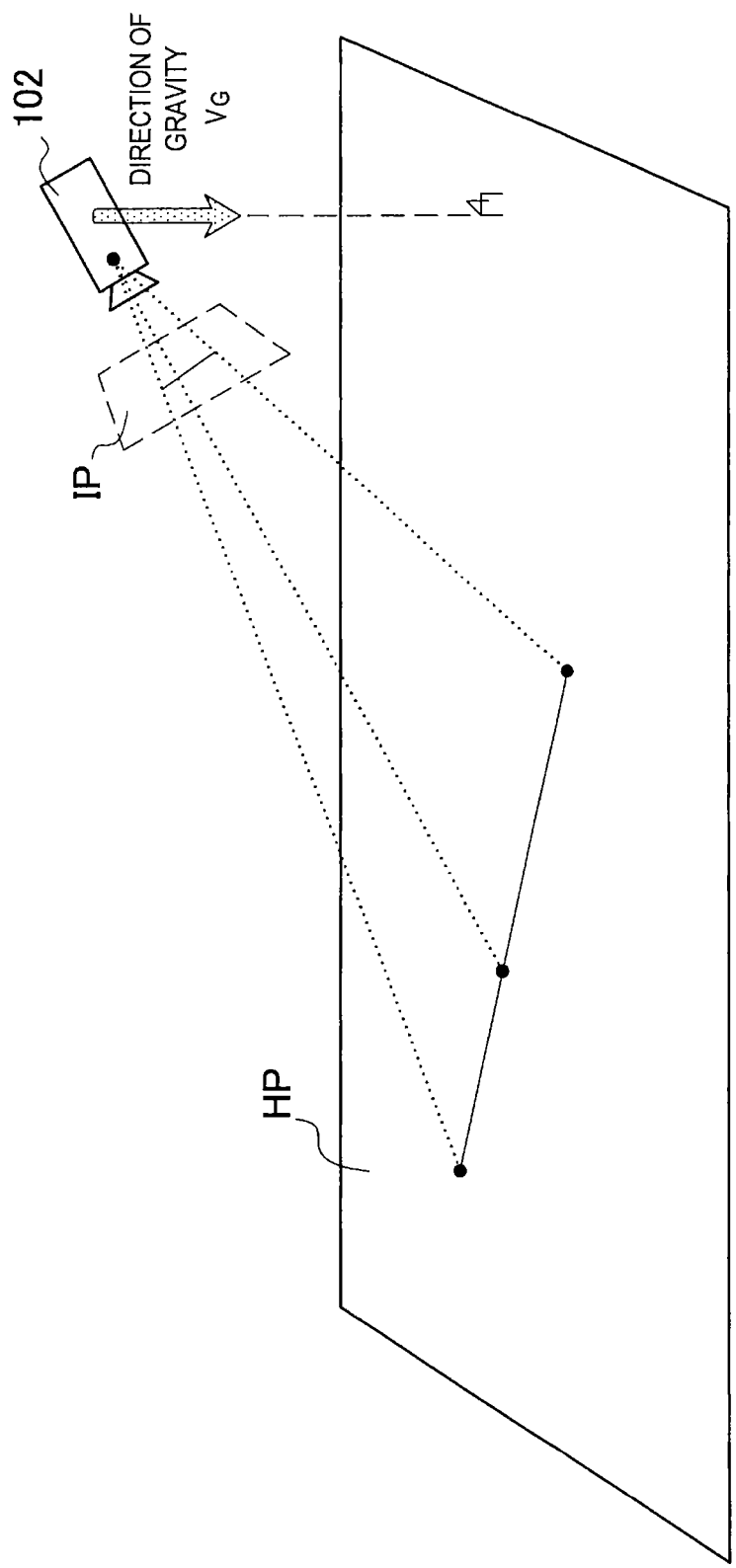
FIG. 5 is an illustrative diagram for describing the relationship between an imaging plane, a horizontal plane, and the direction of gravity.

FIG. 5 is an illustrative diagram for describing the relationship between an imaging plane, a horizontal plane, and the direction of gravity. Referring to FIG. 5, the imaging plane IP of an input image and the horizontal plane HP of a physical space are shown. The horizontal plane HP may be a plane such as a ground surface, a floor surface, or a ceiling that actually exists, or may be a hypothetical plane. The horizontal plane HP is orthogonal to the direction of gravity. An attitude of the horizontal plane HP with respect to the imaging plane IP (or an attitude of the imaging plane IP with respect to the horizontal plane HP) can change depending on an attitude of the imaging unit 102. Thus, the decision unit 130 decides a relative attitude of the horizontal plane HP with respect to the imaging plane IP from a gravity direction vector $V_G$ indicated by the above-described sensor data. Note that, when a three-dimensional coordinate system of (a tri-axial acceleration sensor of) the sensor data does not coincide with a three-dimensional coordinate system of the imaging plane (and the depth direction thereof), the decision unit 130 may perform rotation conversion and scale conversion so that the difference of the coordinate systems is absorbed for the gravity direction vector $V_G$.

Figure 6:
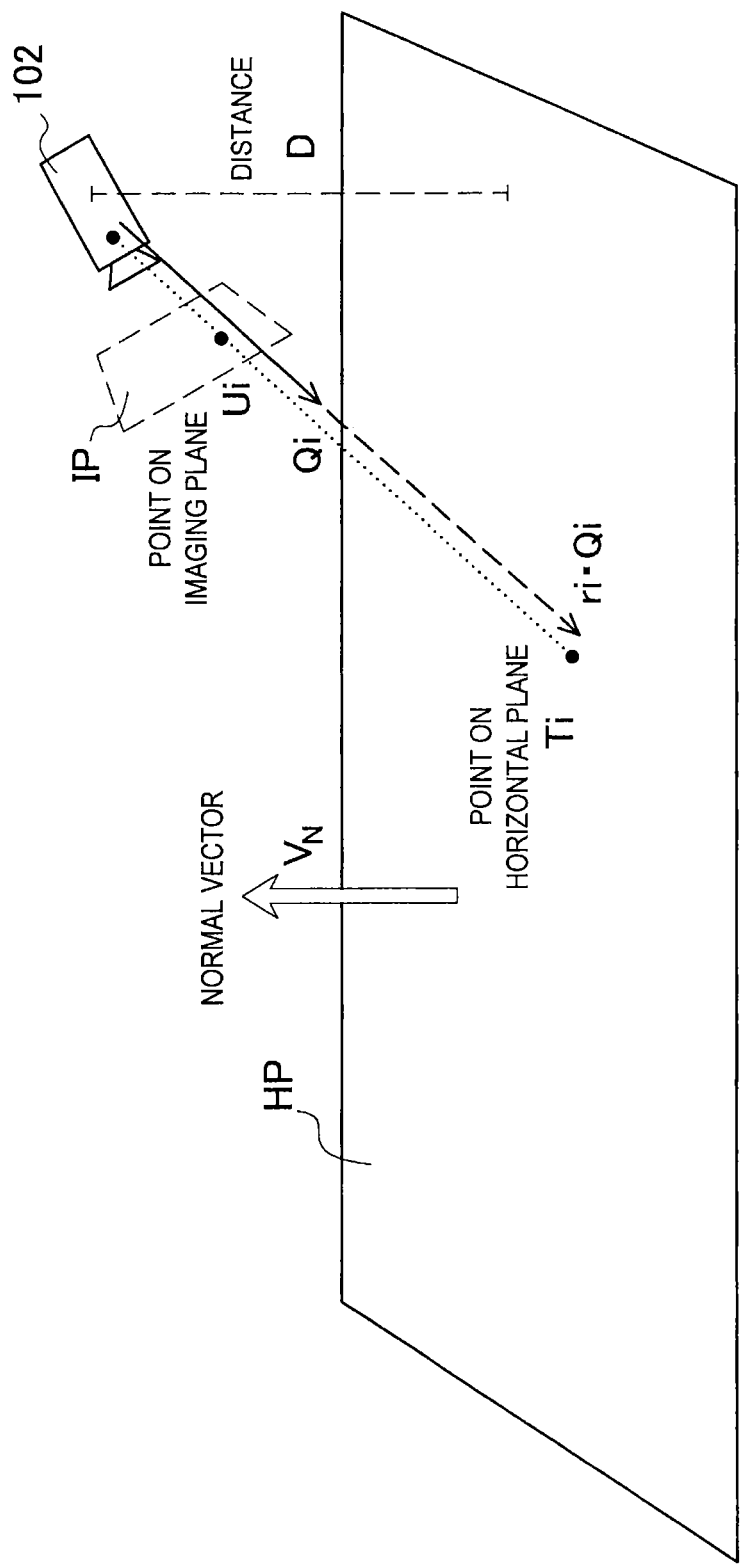
FIG. 6 is an illustrative diagram for describing parameters relating to a 3D structure of the horizontal plane.

FIG. 6 is an illustrative diagram for describing parameters relating to a 3D structure of the horizontal plane. Referring to FIG. 6, a normal vector $V_N$ indicating an attitude of the horizontal plane in a coordinate system of the imaging unit 102 is shown. The normal vector $V_N$ is decided using the gravity direction vector $V_G$ shown in FIG. 5. When conversion of the coordinate system is not performed, $V_N = -V_G$ or $V_N = V_G$ is possible. Note that a size of the gravity direction vector $V_G$ is set to be normalized. For example, when an optical axis of the imaging unit 102 faces down, $V_N = -V_G$ can be selected. The horizontal plane HP in this case can correspond to a ground surface, a floor surface, or the like positioned lower than the focus of the imaging unit 102. On the other hand, when the optical axis of the imaging unit 102 faces up, $V_N = V_G$ can be selected. The horizontal plane HP in this case can correspond to a ceiling surface or the like positioned higher than the focus of the imaging unit 102.

If the normal vector $V_N$ is set to be in $(n_x, n_y, n_z)$ in a coordinate system $(x, y, z)$ of the imaging unit 102, a plane equation of the horizontal plane HP is expressed as $n_x x + n_y y + n_z z = D$ using a distance D from the origin to the horizontal plane HP. The distance D changes depending on positions of the horizontal plane in the physical space. In addition, when the distance D changes, a scale of the horizontal plane in the input image changes. In the present embodiment, the decision unit 130 decides a hypothetical horizontal plane having an attitude $V_N$ and a tentative position decided based on sensor data with an assumption of, for example, D=1 for the distance D. Then, the decision unit 130 causes the 3D structure DB 135 to store the plane equation of $n_x x + n_y y + n_z z = D$ decided as described above as a 3D structure of the horizontal plane HP.

Figure 7:
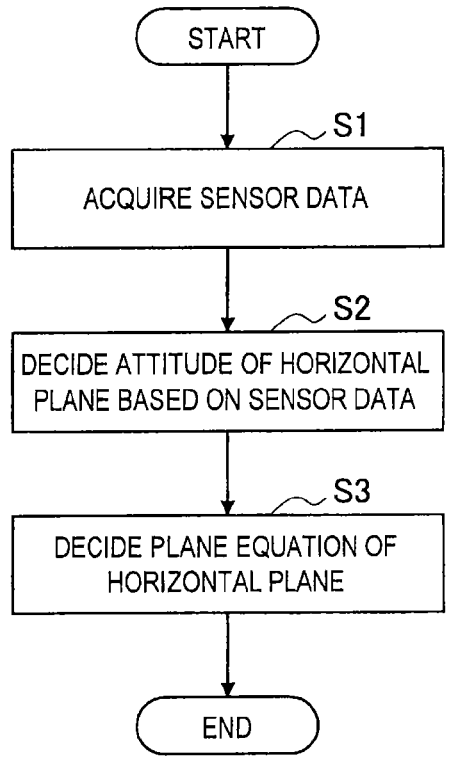
FIG. 7 is a flowchart showing a first example of a flow of a plane decision process performed by a decision unit exemplified in FIG. 4.

FIG. 7 is a flowchart showing a first example of a flow of a plane decision process performed by the decision unit 130. In the first example, an attitude of the horizontal plane is decided. Referring to FIG. 7, the data acquisition unit 125 first acquires sensor data indicating the direction of gravity exerted on the imaging unit 102 (Step S1). Next, the decision unit 130 decides the attitude of the horizontal plane (the above-described normal vector $V_N$) based on the sensor data acquired by the data acquisition unit 125 (Step S2). In this case, the orientation of the horizontal plane may be decided according to whether the imaging unit 102 faces the upper direction or the lower direction. Next, the decision unit 130 decides the plane equation of the horizontal plane $n_x x + n_y y + n_z z = D$ using a tentative value (for example, D=1) defined in advance as a constant term of the plane equation (Step S3).

(3-2) Decision of an Attitude of a Vertical Plane

Figure 8:
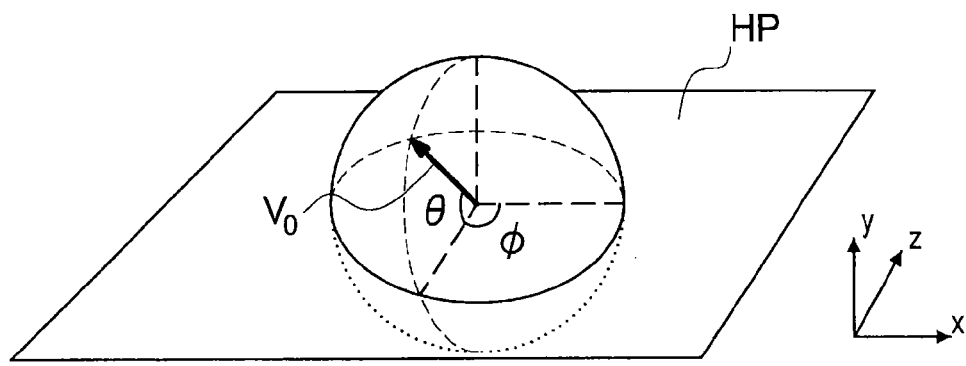
FIG. 8 is an illustrative diagram for describing an elevation and depression angle and an azimuth angle.

As described above, the attitude of the horizontal plane can be decided using only the acceleration data indicating the direction of gravity. On the other hand, an attitude of a vertical plane can be decided using any restriction, additional sensor data, or a user input. Generally, an attitude of a plane of a physical space is constituted by an elevation and depression angle component and an azimuth angle component. An elevation and depression angle (Elevation) is an angle in the upper-lower direction with respect to a horizontal plane, and generally has a value in the range of –90° to 90° (angle θ of a vector $V_O$ in FIG. 8). An azimuth angle (Azimuth) is an angle in the east, west, south, and north directions with respect to a vertical plane, and generally has a value in the range of 0° to 360° (angle φ of the vector $V_O$ in FIG. 8). With respect to this, an elevation and depression angle component can be decided using the same technique as in decision of an attitude of the horizontal plane. Several techniques are possible in deciding the remaining azimuth angle component.

In a first technique, the decision unit 130 decides an attitude of a vertical plane based on acceleration data and a pre-defined restriction of a direction. The pre-defined restriction of a direction may be a restriction that, for example, an imaging plane be face-to-face with a target vertical plane (or that a camera be set such that the planes are face-to-face). In this case, the decision unit 130 can decide a vector closest to an optical axis (for example, a vector having the largest inner product with a vector facing the opposite direction to the optical axis) of a camera among unit vectors orthogonal to normal vectors of the horizontal plane decided based on the direction of gravity as a normal vector of the target vertical plane.

Figure 9:
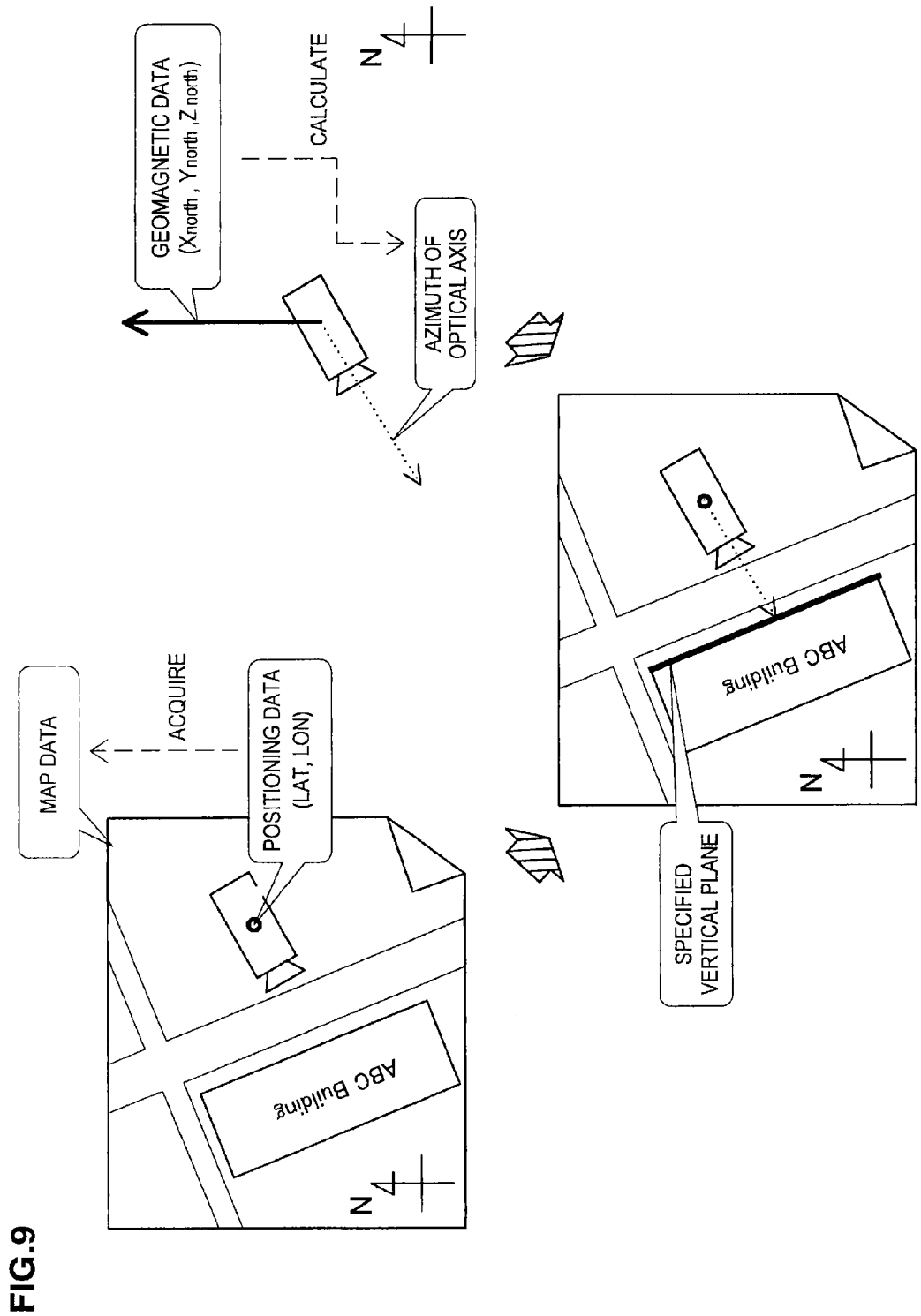
FIG. 9 is an illustrative diagram for describing an example of a technique for deciding an attitude of a vertical plane.

In a second technique, the decision unit 130 decides an attitude of a vertical plane based on acceleration data and positioning data. To be more specific, the decision unit 130 acquires map data of a peripheral region of a position of the information processing device 100 indicated by the positioning data via the data acquisition unit 125 (the upper-left part of FIG. 9). The map data acquired here indicates the positional relationship between the imaging unit 102 and one or more vertical planes positioned in the periphery of the information processing device 100. In addition, the decision unit 130 calculates an azimuth of the optical axis of the imaging unit 102 based on geomagnetic data (the upper-right part of FIG. 9). Next, the decision unit 130 specifies a vertical plane entering an angle of view of the imaging unit 102 from the one or more vertical planes in the map data. The vertical plane specified here may be a plane (a wall surface of a building or the like) that collides first with a line segment extending in the optical axis direction of the imaging unit 102 on the map based on a position indicated by the positioning data as the origin (the lower part of FIG. 9). The decision unit 130 acquires the azimuth of the vertical plane specified in the coordinate system of the physical space from the map data, and converts the azimuth of the specified vertical plane into an azimuth in the coordinate system of the imaging unit 102 using a direction of geomagnetism indicated by the geomagnetic data. Then, the decision unit 130 can decide a vector closest to the converted azimuth of the vertical plane among the unit vectors orthogonal to the normal vectors of the horizontal plane as a three-dimensional normal vector of the vertical plane (in the coordinate system of the imaging unit 102).

Figure 10:
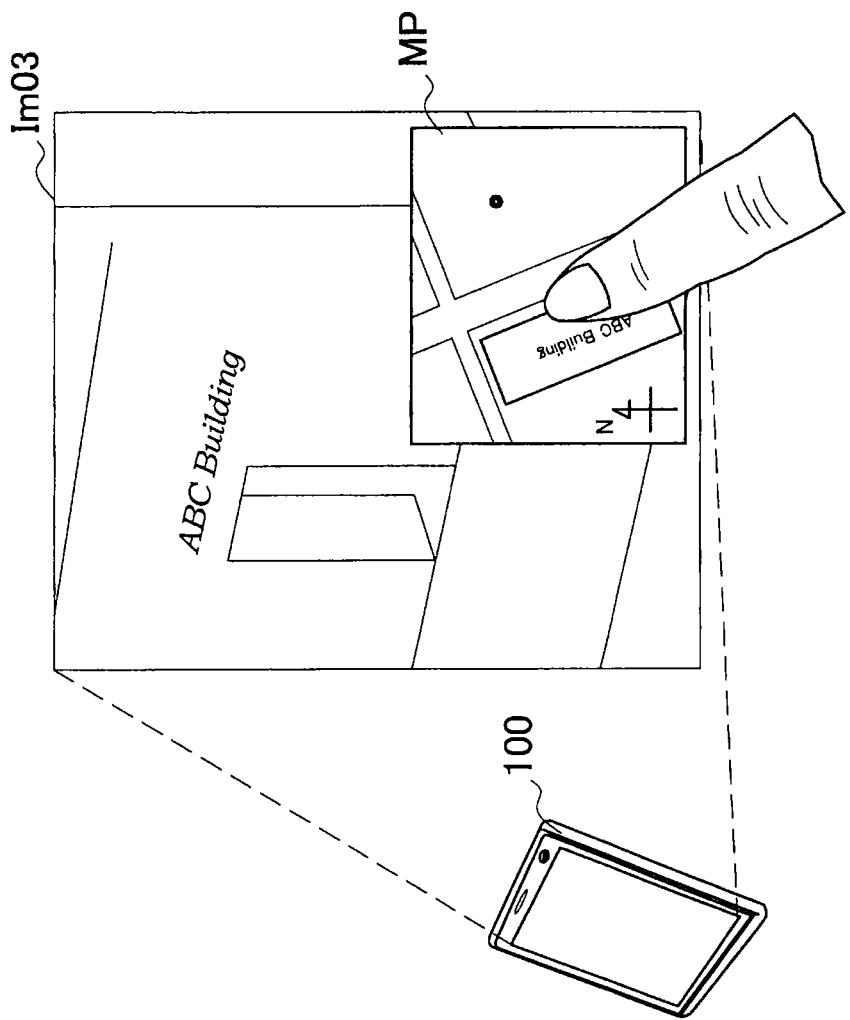
FIG. 10 is an illustrative diagram for describing an example of a user interface for enabling a user to designate a vertical plane on a map.

As a modified example of the second technique, the decision unit 130 may allow a user to designate a vertical plane projected in an input image using an azimuth of the optical axis calculated based on geomagnetic data, instead of specifying a vertical plane projected in the input image on a map. Referring to FIG. 10, a map MP is superimposed on an image Im03 on a screen of the display unit 110. The map MP shows a position of a wall surface of a building and the like present in a peripheral region of a position indicated by positioning data. A user designates a vertical plane projected in an input image with an operation of, for example, touching the map MP or the like. Accordingly, the decision unit 130 can recognize what vertical plane on the map is projected in the input image. As another modified example, the decision unit 130 may recognize what vertical plane on the map is projected in the input image by matching an existing image of a building with the input image.

Figure 11:
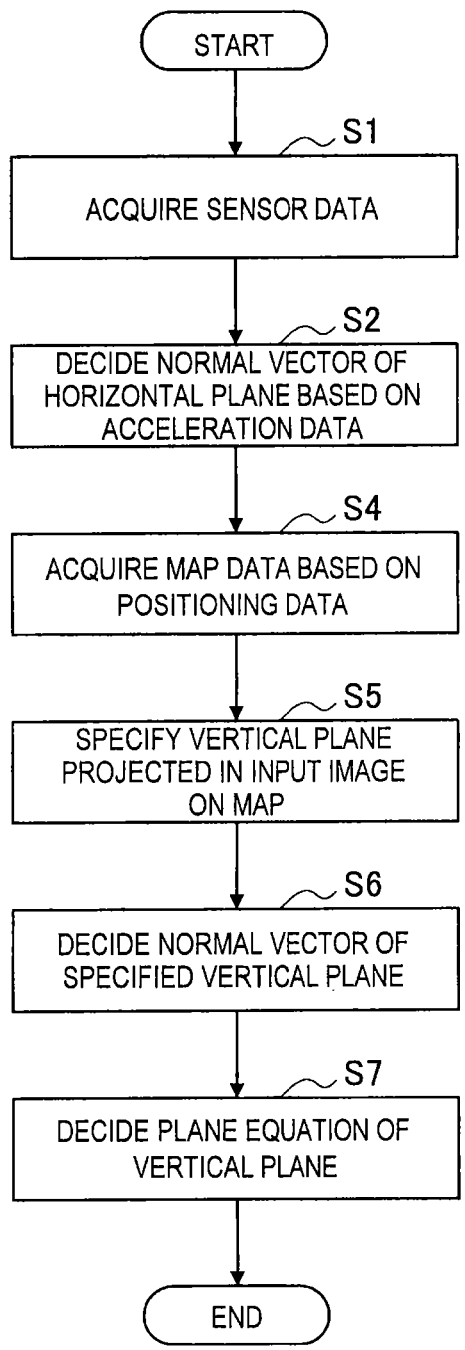
FIG. 11 is a flowchart showing a second example of the flow of the plane decision process performed by the decision unit exemplified in FIG. 4.

FIG. 11 is a flowchart showing a second example of the flow of the plane decision process performed by the decision unit 130. In the second example, an attitude of a vertical plane is decided using the above-described second technique. Referring to FIG. 11, the data acquisition unit 125 first acquires sensor data that can include acceleration data, positioning data, and geomagnetic data (Step S1). Next, the decision unit 130 decides a normal vector of a horizontal plane based on the acceleration data indicating the direction of gravity (Step S2). In addition, the decision unit 130 acquires map data of a peripheral region of a position indicated by the positioning data (Step S4). Next, the decision unit 130 specifies a vertical plane projected in an input image on the map using, for example, the geomagnetic data (Step S5). Here, instead of the geomagnetic data, a user input or image matching may be used. Next, the decision unit 130 decides a normal vector of the specified vertical plane which is orthogonal to the normal vector of the horizontal plane specified in Step S2 (Step S6). Next, the decision unit 130 decides a plane equation of the specified vertical plane using a tentative value defined in advance as a constant term of the plane equation (Step S7).

(3-3) Decision of an Attitude of Another Plane

An attitude of a plane that is neither a horizontal plane nor a vertical plane (hereinafter referred to as an arbitrary plane) is not decided directly from the direction of gravity and other sensor data. However, with reference to an attitude of a horizontal plane or a vertical plane decided according to the above-described techniques, a user interface that enables a user to designate an attitude of an arbitrary plane can be disposed in an AR space.

FIG. 12A is an illustrative diagram showing an example of the user interface for enabling a user to designate an attitude of an arbitrary plane. Referring to FIG. 12A, a user interface UI1 having a spherical exterior is superimposed on an image Im04. Note that, although not illustrated for the sake of clarity of the drawing, the arbitrary plane projected in an input image is also assumed to be displayed in the image Im04. A reference plane RP is a horizontal plane passing through the center of the sphere of the user interface UI1. The decision unit 130 decides an attitude of the reference plane RP according to the above-described techniques for deciding an attitude of a horizontal plane. In addition, with reference to the attitude of the reference plane RP, the user interface UI1 is disposed in an AR space by a user interface unit 170 to be described later. By tracing the direction of gravity, the disposition of the user interface UI1 is maintained in the AR space over a plurality of frames. As a result, the user interface UI1 is displayed as being fixed in the physical space even if an angle of view changes.

The user interface UI1 has a disc-shaped operation plane OD1 passing through the center of the sphere. In an initial state, the operation plane OD1 may be disposed horizontally like the reference plane RP. Two axes AX1 and AX2 associated with the operation plane OD1 are axes perpendicular to each other and parallel to the operation plane OD1. An axis AX3 is an axis perpendicular to the axes AX1 and AX2. The operation plane OD1 is three-dimensionally rotation-operable by the user. For example, when the user moves (drags) his or her finger to slide in the lateral direction on the screen, the operation plane OD1 rotates around the axis AX3. When the user slides his or her finger in the longitudinal direction, the operation plane OD1 rotates around the axis AX2. With the operations, the user causes the operation plane OD1 to three-dimensionally rotate so that the arbitrary plane projected in the input image is parallel to the operation plane OD1. Then, the decision unit 130 decides the attitude of the arbitrary plane using the attitude of the operated operation plane OD1. A normal vector of the arbitrary plane has the same orientation as the axis AX3 after the operation.

Note that a user interface for deciding an attitude of an arbitrary plane is not limited to the example of FIG. 12A. The user interface may have a shape other than a sphere, and the operation plane may have a shape other than a disc shape. In addition, the operation plane OD1 may set to be operable according to various operations different from the operation of causing a finger to slide (for example, tapping of a predetermined button, pressing an arrow key, or the like). In addition, a vertical plane may be used instead of a horizontal plane as a reference plane for disposing a user interface.

Figure 12B:
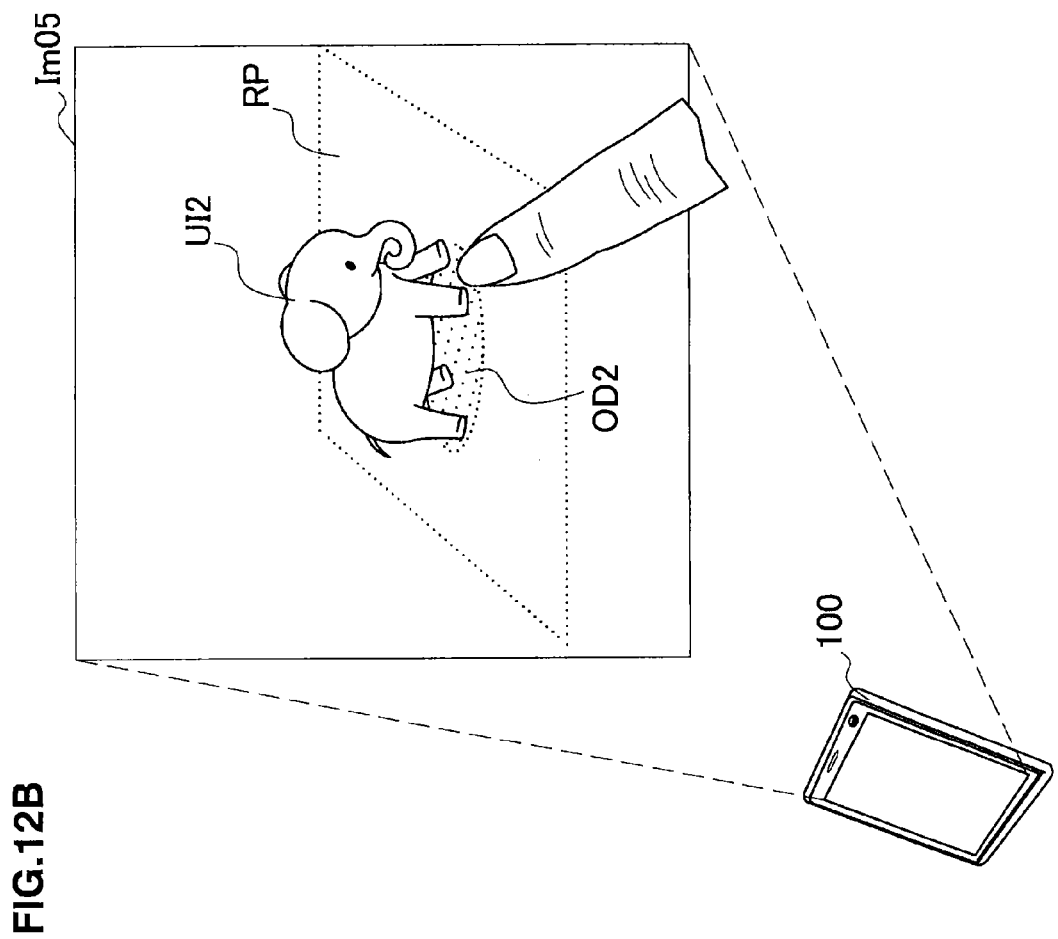
FIG. 12B is an illustrative diagram showing another example of the user interface for enabling a user to designate an attitude of an arbitrary plane.

FIG. 12B is an illustrative diagram showing another example of the user interface for enabling a user to designate an attitude of an arbitrary plane. Referring to FIG. 12B, a user interface UI2 in which an animal character appears is superimposed on an image Im05. The user interface UI2 may be one annotation for an AR application, rather than a dedicated user interface for decision of an attitude of a plane. Note that, although not illustrated for the sake of clarity of the drawing, the arbitrary plane projected in an input image is also assumed to be displayed in the image Im05. The decision unit 130 decides an attitude of the reference plane RP according to the above-described techniques for deciding an attitude of a horizontal plane. Then, with reference to the attitude of the reference plane RP, the user interface UI2 is disposed in an AR space. The user interface UI2 has an operation plane OD2 disposed in parallel with the reference plane RP in an initial state. The operation plane OD2 has an exterior of a shadow of the character. The user interface UI2 (the character and the shadow thereof) is three-dimensionally rotation-operable by a user. With the operation, the user three-dimensionally rotates the user interface UI2 so that the arbitrary plane projected in the input image is parallel with the operation plane OD2. Then, the decision unit 130 decides the attitude of the arbitrary plane using the attitude of the operated operation plane OD2.

Figure 13:
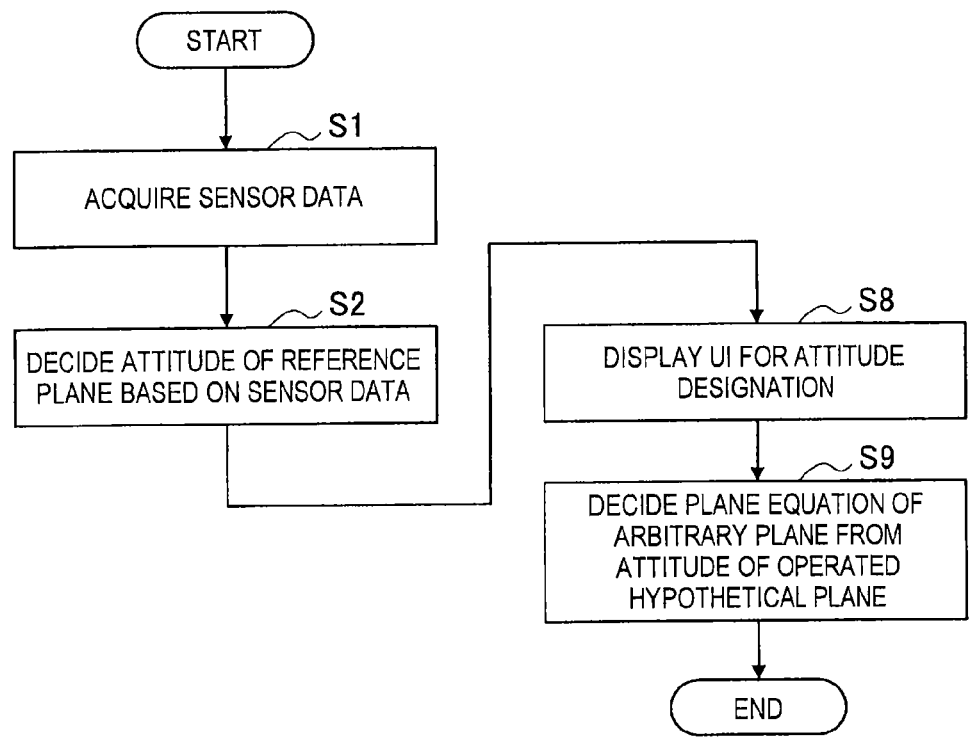
FIG. 13 is a flowchart showing a third example of the flow of the plane decision process performed by the decision unit exemplified in FIG. 4.

FIG. 13 is a flowchart showing a third example of the flow of the plane decision process performed by the decision unit 130. In the third example, an attitude of an arbitrary plane is decided using the above-described user interfaces. Referring to FIG. 13, the data acquisition unit 125 first acquires sensor data indicating the direction of gravity (Step S1). Next, the decision unit 130 decides an attitude of the reference plane corresponding to a horizontal plane based on the sensor data (Step S2). Next, the user interface UI1 exemplified in FIG. 12A (or the user interface UI2 exemplified in FIG. 12B) is disposed in the AR space with reference to the attitude of the reference plane, and displayed on the screen (Step S8). The display of the user interface can continue until, for example, a user input indicating the end of the operation is detected. Next, the decision unit 130 decides a normal vector of the arbitrary plane from an attitude of the operation plane of the operated user interface, and further decides a plane equation of the arbitrary plane (Step S9).

(4) 3D Structure DB

The 3D structure DB 135 is database in which a 3D structure of a physical space imaged by the imaging unit 102 is stored. The 3D structure DB 135 stores, for example, constant terms and coefficients constituting the plane equation of a plane, in other words, positions and attitudes decided by the decision unit 130. In addition, the 3D structure DB 135 may store positions and attitudes of the imaging unit 102 which are additionally recognized by the SLAM arithmetic operation unit 145 and can change with time. Furthermore, the 3D structure DB 135 may store positions and attitudes of a real object that can be recognized by the image recognition unit 156. The display control unit 165 to be described later decides disposition of annotations in an AR space according to the positions and attitudes of a plane or the positions and attitudes of a real object stored in the 3D structure DB 135.

(5) Conversion Unit

The conversion unit 140 performs conversion between a three-dimensional position of a given point on a plane and a two-dimensional position in an image (in other words, on an imaging plane) corresponding to the three-dimensional position using an attitude of the plane decided by the decision unit 130. A calculation process for the conversion between the three-dimensional position and the two-dimensional position by the conversion unit 140 may be performed following a known pinhole camera model. The calculation process performed by the conversion unit 140 following the pinhole camera model will be described with reference again to FIG. 6 exemplifying the horizontal plane.

The coordinates of an arbitrary point $U_i$ on an imaging plane can be expressed as follows.

[Math 1]

$$U_i = \begin{pmatrix} u_i \\ v_i \\ 1 \end{pmatrix} \quad (1)$$

The point $U_i$ is projected on a point $Q_i$ in the three-dimensional space as follows using an inverse matrix $A^{-1}$ of a camera inner parameter matrix A:

[Math 2]

$$Q_i = A^{-1} U_i \quad (2)$$

$$A = \begin{pmatrix} f_x & 0 & C_x \\ 0 & f_y & C_y \\ 0 & 0 & 1 \end{pmatrix} \quad (3)$$

Here, $(f_x, f_y)$ indicates a scale change rate between the imaging plane and the physical space. $(C_x, C_y)$ is the center position of the imaging plane. If a three-dimensional position of a given point on the horizontal plane HP is assumed to be $T_1(t_x, t_y, t_z)$, the following expression is satisfied between $T_i$ and $Q_i$.

[Math 3]

$$T_i = r_i \cdot Q_i \quad (4)$$

Here, the scale $r_i$ of expression (4) is elicited from the following expression. Note that, as described above, D may be a tentative value defined in advance.

[Math 4]

$$r_i = \frac{D}{V_N^t Q_i} = \frac{D}{V_N^t (A^{-1} U_i)} \quad (5)$$

Thus, when the two-dimensional position $U_i$ at which the given point on the horizontal plane HP is projected on the imaging plane is given, a three-dimensional position $T_i$ of the point can be calculated based on the following expression (6) using an attitude $V_N$ and a position D of the horizontal plane HP. In addition, a method of obtaining the two-dimensional position $U_i$ on the imaging plane corresponding to the given point when the three-dimensional position $T_i$ of the point on the horizontal plane HP is given can also be elicited following the same pinhole camera model.

[Math 5]

$$T_i = r_i \cdot Q_i = r_i \cdot A^{-1} U_i = \frac{D}{V_N^t (A^{-1} U_i)} \cdot A^{-1} U_i \quad (6)$$

In the present embodiment, the given point that is the target of the calculation process performed by the conversion unit 140 includes a feature point selected at least at the time of initialization of the SLAM method to be described next. Points constituting annotations for an AR application can also be targets of the calculation process performed by the conversion unit 140. Note that, when a vertical plane or an arbitrary plane is used instead of the horizontal plane, coordinate conversion can be performed in the same manner as the method described herein.

(6) SLAM Arithmetic Operation Unit

The SLAM arithmetic operation unit 145 dynamically recognizes a 3D structure of a physical space projected in an input image of a single-eye camera and positions and attitudes of the imaging unit 102 by performing arithmetic operations based on the SLAM method.

First, an overall flow of a SLAM arithmetic operation process performed by the SLAM arithmetic operation unit 145 will be described using FIG. 14. Next, details of the SLAM arithmetic operation process will be described using FIGS. 15 to 18.

Figure 14:
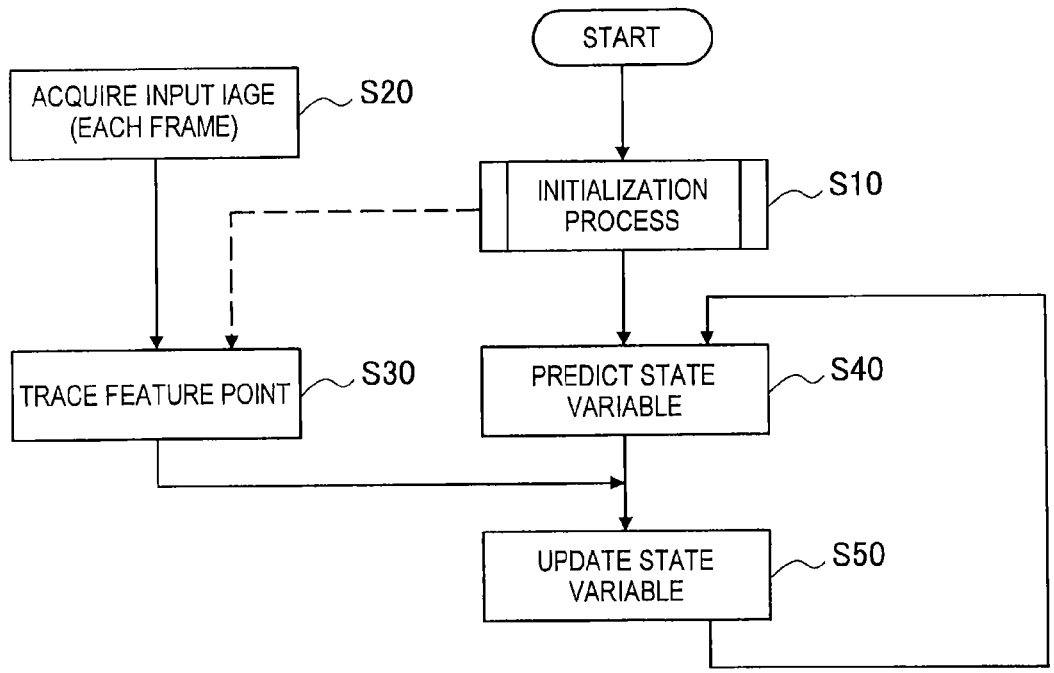
FIG. 14 is a flowchart showing an example of a flow of a SLAM arithmetic operation process performed by a SLAM arithmetic operation unit exemplified in FIG. 4.

FIG. 14 is a flowchart showing an example of a flow of the SLAM arithmetic operation process performed by the SLAM arithmetic operation unit 145. In FIG. 14, when the SLAM arithmetic operation process starts, the SLAM arithmetic operation unit 145 first initializes a state variable by executing an initialization process (Step S10). In the present embodiment, the state variable is a vector that includes a position and an attitude (rotation angle) of a camera, a moving speed and an angular velocity of the camera, and a position of one or more feature points as elements. In addition, the SLAM arithmetic operation unit 145 sequentially receives inputs of input images acquired by the image acquisition unit 120 (Step S20). Processes of Step S30 to Step S50 can be repeated for each input image (in other words, each frame).

In Step S30, the SLAM arithmetic operation unit 145 traces feature points projected in an input image. For example, the SLAM arithmetic operation unit 145 cross-checks patches (patches) (for example, a small image having 3×3=9 pixels having a feature point at the center) of each of the feature points acquired in advance with a new input image. Then, the SLAM arithmetic operation unit 145 detects the positions of the patches within the input image, in other words, the positions of the feature points. The positions of the feature points detected here are used when a state variable is updated later.

In Step S40, the SLAM arithmetic operation unit 145 generates a predicted value of the state variable, for example, one frame later based on a predetermined prediction model. In addition, in Step S50, the SLAM arithmetic operation unit 145 updates the state variable using the predicted value of the state variable generated in Step S40 and an observation value according to the positions of the feature points detected in Step S30. The SLAM arithmetic operation unit 145 executes the processes of Steps S40 and S50 based on the principle of the extended Kalman filter.

As a result of the process, the value of the state variable updated for each frame is output. Hereinafter, the content of processes of the initialization of the state variable (Step S10), the tracing of the feature points (Step S30), the prediction of the state variable (Step S40), and the updating of the state variable (Step S50) will be described in more detail.

(6-1) The Initialization of the State Variable

Figure 15:
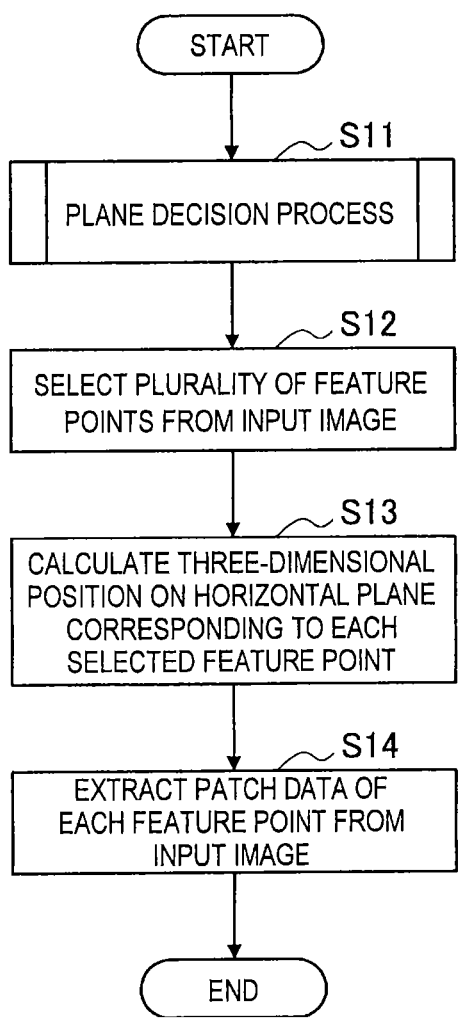
FIG. 15 is a flowchart showing an example of a flow of an initialization process included in the SLAM arithmetic operation process exemplified in FIG. 14.

The state variable used by the SLAM arithmetic operation unit 145 is initialized in the initialization process exemplified in FIG. 15. Referring to FIG. 15, the plane decision process is first performed by the decision unit 130 (Step S11). As a result, a relative position and attitude of a plane in a physical space with respect to an imaging plane are decided. Next, the SLAM arithmetic operation unit 145 selects a plurality of feature points from an input image (Step S12). The feature points selected here may be, for example, points in characteristic pixel positions corresponding to edges or corners of texture. Next, the conversion unit 140 calculates three-dimensional positions on a plane corresponding to each of the feature points selected by the SLAM arithmetic operation unit 145 according to the above-described expression (6) (Step S13). Next, the SLAM arithmetic operation unit 145 extracts patch data of each of the selected feature points from the input image (Step S14). Using the patch data extracted here, the tracing of the feature points can be performed in Step S30 of FIG. 14.

(6-2) The Tracing of the Feature Points

Figure 16:
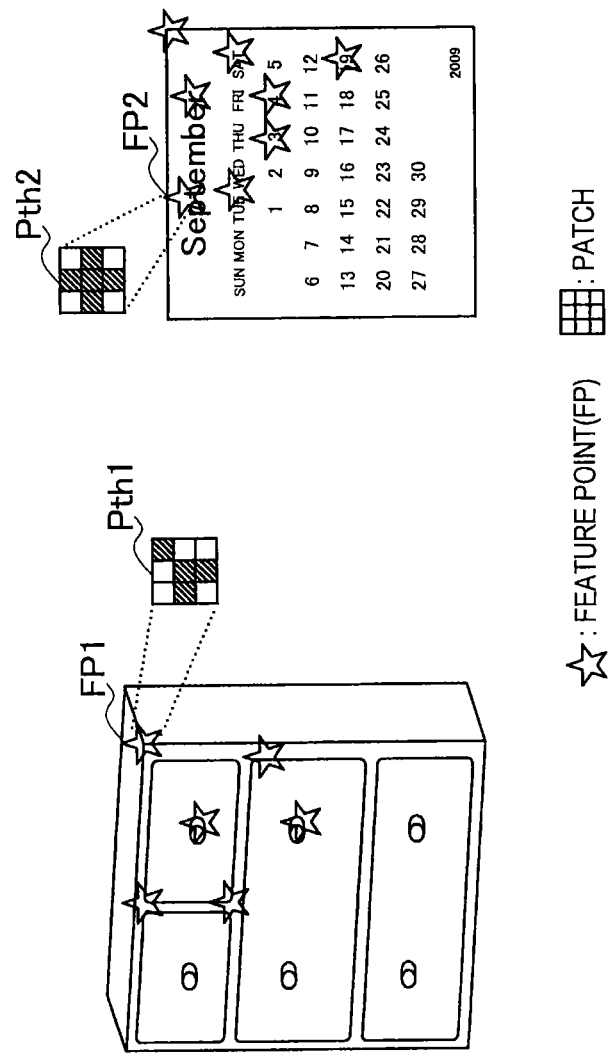
FIG. 16 is an illustrative diagram for describing feature points set on a real object.
Figure 17:
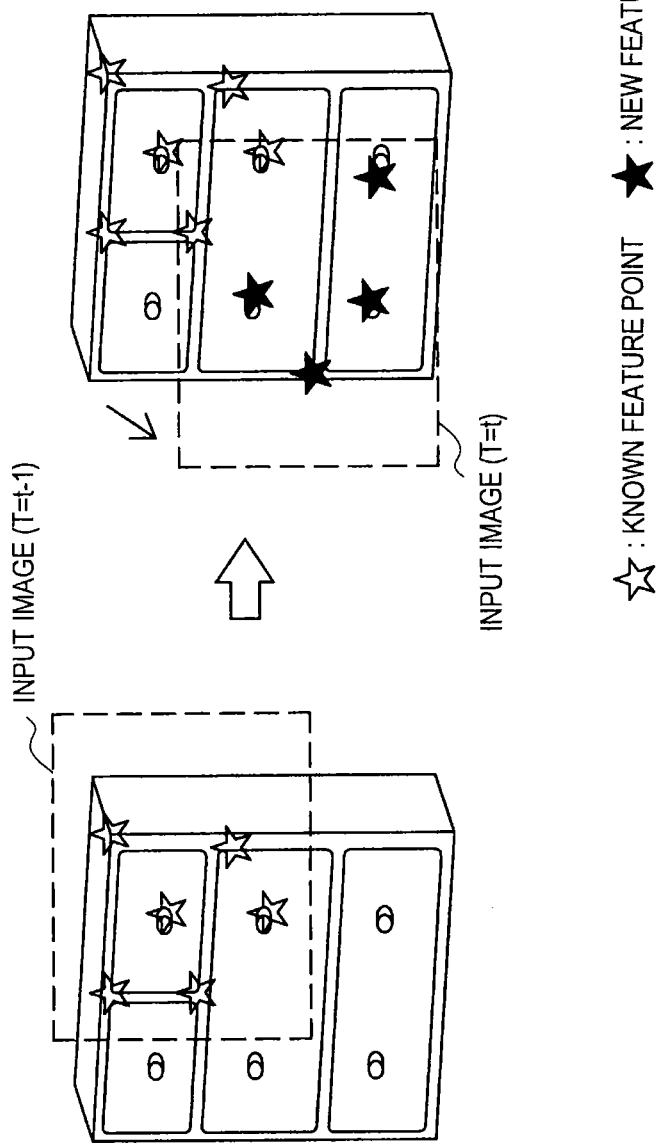
FIG. 17 is an illustrative diagram for describing addition of feature points.

The tracing of the feature points is performed using patch data of one or more feature points found in an exterior of an object (real object) that can be present in a physical space. FIG. 16 shows a closet (left in the drawing) and a calendar (right in the drawing) as two examples of real objects. On each of the real objects, one or more feature points (FP: Feature Point) are set. For example, feature points FP1 are feature points set on the closet, and a patch Pth1 is defined in association with the feature points FP1. In addition, feature points FP2 are feature points set on the calendar, and a patch Pth2 is defined in association with the feature points FP2.

SLAM arithmetic operation unit 145 cross-checks the patch data of the feature points extracted in the initialization process exemplified in FIG. 15 or patch data of feature points newly set thereafter with partial images included in the input image. Then, the SLAM arithmetic operation unit 145 specifies positions of the feature points included in the input image (for example, detected positions of center pixels of the patches) as a result of the cross-checking.

One characteristic of the SLAM method is that a feature point being traced can be dynamically changed along the time. For example, in the example of FIG. 17, six feature points are detected in the input image at the time T=t−1. Next, when the position or attitude of the camera is changed at the time T=t, only two feature points out of the six that were projected in the input image at the time of T=t−1 are projected in the input image. In this case, the SLAM arithmetic operation unit 145 sets new feature points in positions that have a characteristic pixel pattern in the input image, and the new feature points may be used in the SLAM arithmetic operation process for succeeding frames. For example, in the example of FIG. 17, four new feature points are set on the real object at the time T=t. Due to the characteristic, in the SLAM method, a cost for setting the feature points in advance can be reduced, and recognition accuracy can be improved by using a number of added feature points.

(6-3) The Prediction of a State Variable

In the present embodiment, the SLAM arithmetic operation unit 145 uses a state variable X shown in the following expression as a state variable to which the extended Kalman filter is applied.

[Math 6]

$$X = \begin{pmatrix} x \\ \omega \\ \dot{x} \\ \dot{\omega} \\ p_1 \\ \vdots \\ p_N \end{pmatrix} \quad (7)$$

A first element of the state variable X in expression (7) indicates a three-dimensional position of the camera in the physical space as shown in the following expression.

[Math 7]

$$x = \begin{pmatrix} x_c \\ y_c \\ z_c \end{pmatrix} \quad (8)$$

In addition, a second element of the state variable is a four-dimensional vector ω having a quaternion corresponding to a rotation matrix indicating an attitude of the camera as an element. Note that the attitude of the camera may be expressed using an Euler angle in change of the quaternion. In addition, third and fourth elements of the state variable respectively indicate a moving speed and an angular velocity of the camera.

Furthermore, fifth and succeeding elements of the state variable respectively indicate three-dimensional positions $p_i$ of feature points $FP_i$ (i=1, ..., N). Note that, as described above, the number of feature points N can be changed according to processes.

[Math 8]

$$p_i = \begin{pmatrix} x_i \\ y_i \\ z_i \end{pmatrix} \quad (9)$$

The SLAM arithmetic operation unit 145 generates a predicted value of the state variable for the latest frame based on the value of the state variable X initialized in Step S10 or the value of the state variable X updated in the previous frame. The predicted value of the state variable is generated following a state equation of the extended Kalman filter based on multi-dimensional normal distribution shown in the following expression.
[Math 9]

$$\text{Predicted State Variable } \hat{X} = F(X, a) + w \quad (10)$$

Wherein F is a prediction model relating to state transition of a system and a is a prediction condition. In addition, w is Gaussian noise, and can include, for example, a model approximation error, an observation error, or the like. Generally, the average of the Gaussian noise w is zero.

Figure 18:
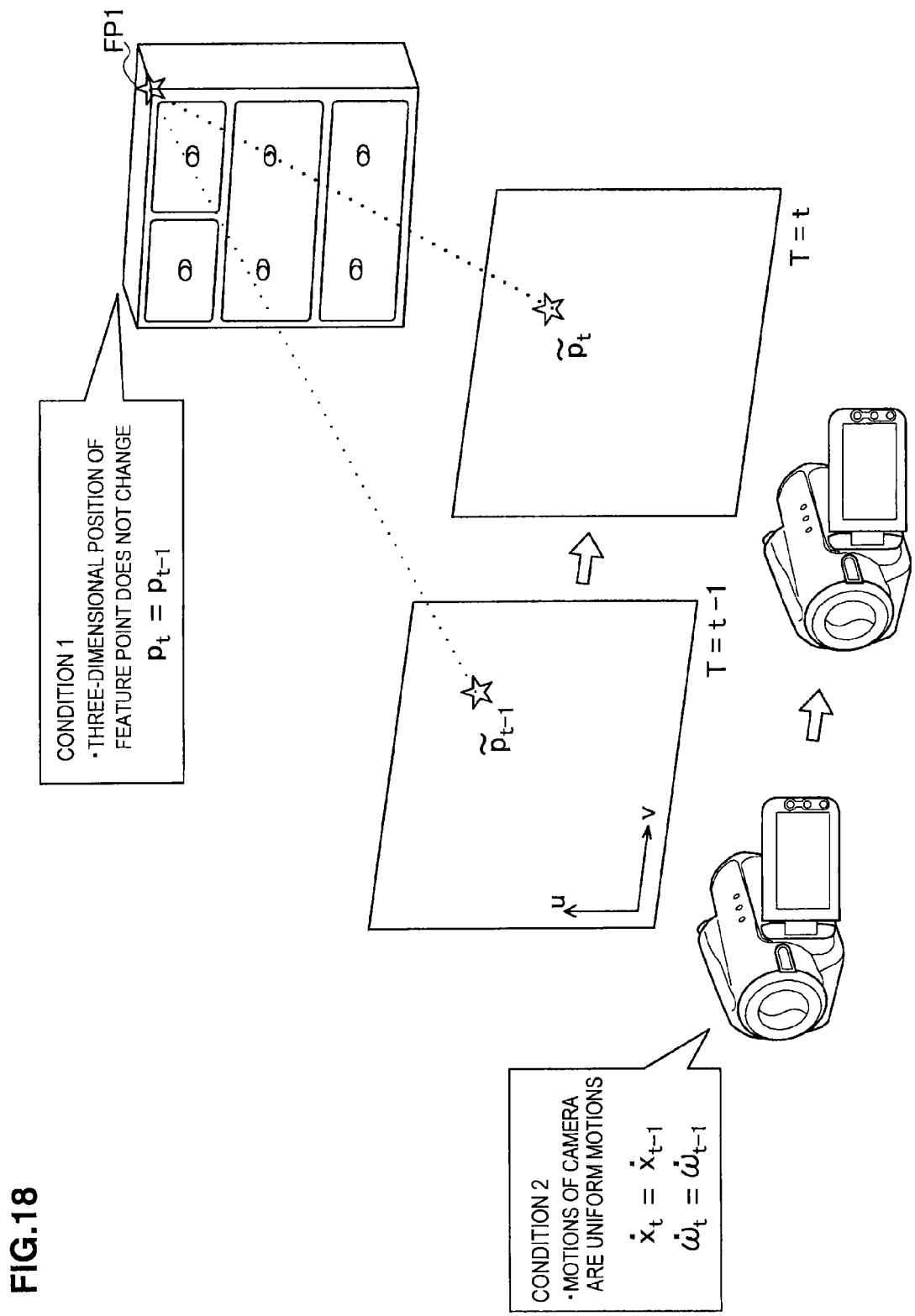
FIG. 18 is an illustrative diagram for describing an example of a prediction model.

FIG. 18 is an illustrative diagram for describing an example of the prediction model according to the present embodiment. Referring to FIG. 18, two prediction conditions of the prediction model according to the present embodiment are shown. As a first condition, first, a three-dimensional position of a feature point is assumed not to change. In other words, if a three-dimensional position of the feature point FP1 at the time T is assumed to be $p_T$, the relationship of the following expression is satisfied.
[Math 10]

$$p_t = p_{t-1} \quad (11)$$

Next, as a second condition, motions of the camera are assumed to be uniform motions. In other words, the relationship of the following expression is satisfied with regard to the speed and angular velocity of the camera from the time T=t−1 to the time T=t.
[Math 11]

$$\dot{x}_t = \dot{x}_{t-1} \quad (12)$$

$$\dot{\omega}_t = \dot{\omega}_{t-1} \quad (13)$$

Based on the prediction model and the state equation shown in expression (10) described above, the SLAM arithmetic operation unit 145 generates the predicted value of the state variable for the latest frame.

(6-4) The Updating of the State Variable

Then, the SLAM arithmetic operation unit 145 evaluates the difference between, for example, observation information predicted from the predicted value of the state variable and actual observation information obtained as a result of the tracing of the feature points using an observation equation. Note that v in expression (14) is the difference.
[Math 12]

$$\text{Observation Information } s = H(\hat{X}) + v \quad (14)$$

$$\text{Predicted Observation Information } \hat{s} = H(\hat{X}) \quad (15)$$

Wherein H indicates an observation model. For example, a position of the feature point $FP_i$ on the imaging plane (u-v plane) is defined as in the following expression.

[Math 13]

$$\text{Position of } FP_i \text{ on Imaging Plane } \tilde{p}_i = \begin{pmatrix} u_i \\ v_i \\ 1 \end{pmatrix} \quad (16)$$

Here, all of the position x of the camera, the attitude ω of the camera, and the three-dimensional position $p_i$ of the feature point $FP_i$ are given as elements of the state variable X. Then, the position of the feature point $FP_i$ on the imaging plane is elicited using the following expression based on the pinhole camera model. Note that λ is a parameter for normalization, A is a camera inner parameter matrix, and $R_ω$ is a rotation matrix corresponding to the quaternion ω indicating the attitude of the camera included in the state variable X.
[Math 14]

$$\lambda \tilde{p}_i = AR_ω(p_i - x) \quad (17)$$

Thus, by searching for the state variable X that minimizes the difference between the predicted observation information elicited using expression (17), i.e., the position of each feature point on the imaging plane and the result of the tracing of the feature points in Step S30 of FIG. 14, the most-likely latest state variable X can be obtained.
[Math 15]

$$\text{Latest State Variable } X \leftarrow \hat{X} + \text{Innov}(s - \hat{s}) \quad (18)$$

The SLAM arithmetic operation unit 145 causes the values of the parameters included in the state variable X dynamically updated according the SLAM method as described above to be stored in the 3D structure DB 135.

(7) Object DB

Figure 19:
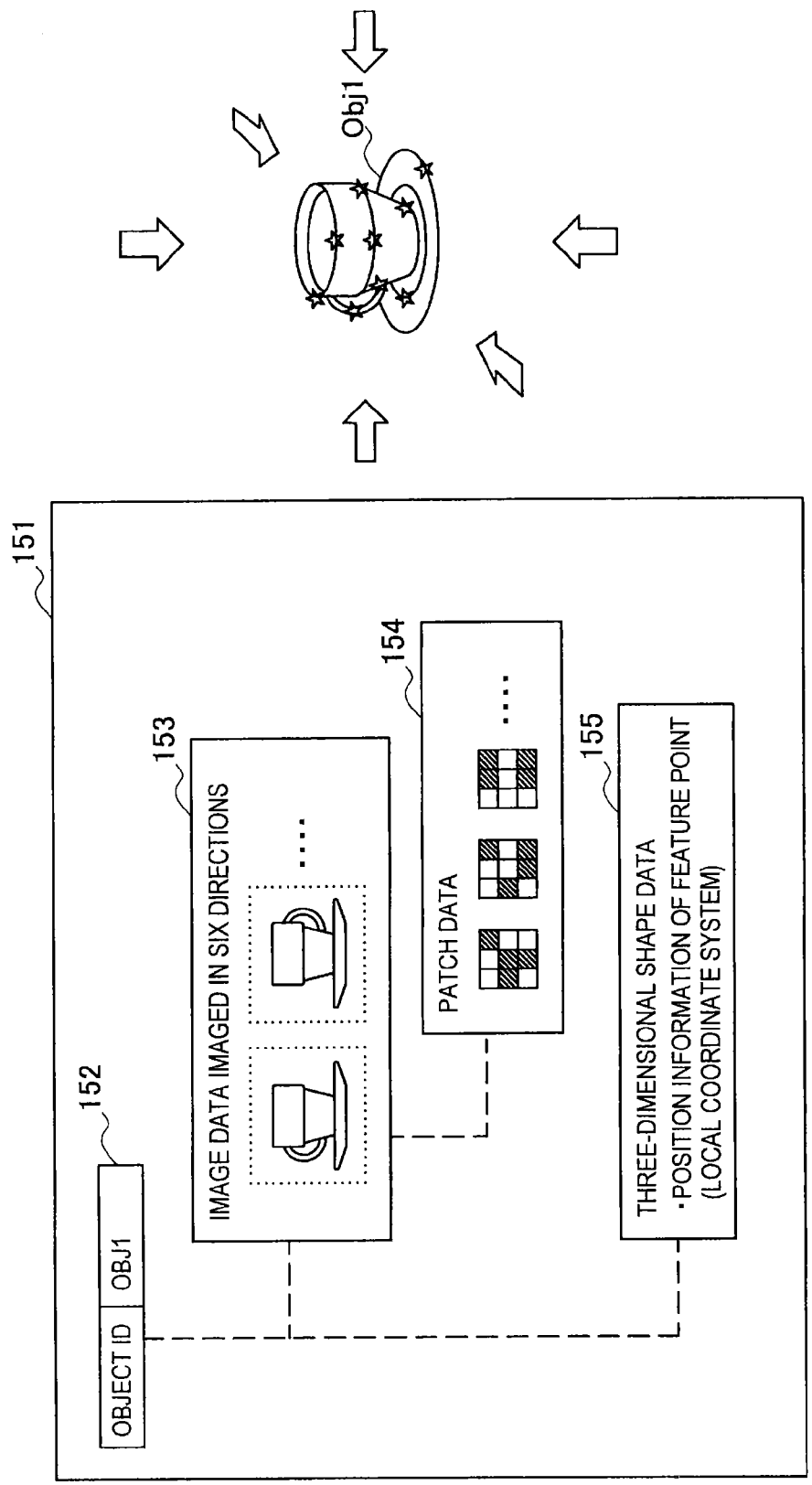
FIG. 19 is an illustrative diagram for describing an example of a composition of feature data.

The object DB 150 is a database in which feature data indicating features of a real object is stored in advance. The feature data stored in the object DB 150 is used in an image recognition process performed by the image recognition unit 156 to be described later. FIG. 19 is an illustrative diagram for describing an example of a composition of the feature data.

Referring to FIG. 19, an example of feature data 151 for a real object Obj1 is shown. The feature data 151 includes an object ID 152, image data 153 imaged in six directions, patch data 154, and three-dimensional shape data 155.

The object ID 152 is an identifier for exclusively identifying the real object Obj1. The image data 153 includes six pieces of image data each obtained by imaging the real object Obj1 in the six directions of the front, rear, left, right, upper, and lower directions. The patch data 154 is a set of small images each having a feature point at the center thereof for each feature point set on the real object. The three-dimensional shape data 155 includes position information indicating three-dimensional positions of feature points in a local coordinate system of the real object Obj1 (in other words, relative positions of the feature points with respect to the origin which are locally defined in the real object Obj1).

(8) Image Recognition Unit

The image recognition unit 156 recognizes which real object is projected in the input image using the above-described feature data stored in the object DB 150. To be more specific, for example, the image recognition unit 156 cross-checks a partial image included in the input image acquired by the image acquisition unit 120 with a patch of each feature point included in the feature data, and then detects the feature point included in the input image. The image recognition unit 156 may re-use the result of the tracing of the feature points obtained by the SLAM arithmetic operation unit 145. Next, when feature points that belong to one real object are detected in a certain region of an image with high density, the image recognition unit 156 can recognize that the real object is projected in the region. The image recognition unit 156 can further recognize the position and attitude of the recognized real object based on the positional relationship between the detected feature points and the three-dimensional shape data exemplified in FIG. 19. Tracing of the position and attitude of the real object after initialization of the SLAM method is realized based on the position and attitude of the real object recognized by the image recognition unit 156 and the position and attitude of the imaging unit 102 recognized by the SLAM arithmetic operation unit 145. The traced position and attitude of the real object are stored in the 3D structure DB 135.

(9) Annotation DB

The annotation DB 160 is a database in which annotation data regarding annotations superimposed on an input image in an AR application is stored in advance. The annotation data may include, for example, identifiers, shape data, motion data, object IDs of relevant real objects, and the like of various annotations including the annotations A11, A12, and A2 exemplified in FIGS. 1 and 2.

(10) Display Control Unit

The display control unit 165 controls display of AR applications using the display unit 110. For example, the display control unit 165 disposes annotations selected from the annotation DB 160 in an AR space corresponding to a physical space projected in an input image in accordance with the purpose of the AR applications. The disposition of the annotations may be decided according to, for example, a position and an attitude of a plane decided by the decision unit 130. The conversion unit 140 calculates two-dimensional positions on an imaging plane each corresponding to feature points constituting an annotation (or vertexes of a polygon or the like) disposed in the AR space using the position and the attitude of the plane on which the annotation is to be disposed. The display control unit 165 superimposes a selected annotation on an input image according to such a calculation result by the conversion unit 140. The image on which the annotation is superimposed is displayed using a display of the display unit 110.

(11) User Interface Unit

The user interface unit 170 provides a user of the information processing device 100 with a user interface using the input unit 106 and the display unit 110 shown in FIG. 3. For example, the user interface unit 170 causes the display unit 110 to display an operation screen for helping a user to operate an AR application, thereby detecting a user input through the operation screen. For example, selecting, changing, moving, or the like of annotations may be performed via the user interface unit 170. In addition, the user interface unit 170 may superimpose, on the input image, the user interface for allowing the user to designate the vertical plane projected in the input image on the map as described using FIG. 10. In addition, the user interface unit 170 may superimpose the user interface for allowing the user to designate an attitude of the arbitrary plane on the input image in which the arbitrary plane is projected as described using FIG. 12A.

[2-3. Process Flow]

Figure 20:
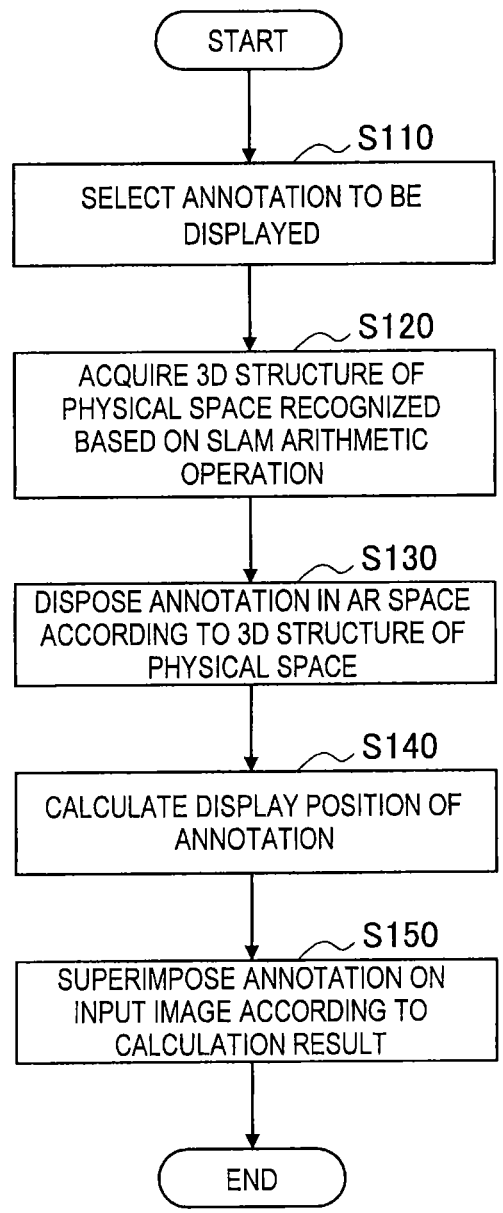
FIG. 20 is a flowchart showing an example of a flow of an overall process performed by the information processing device according to the first embodiment.

FIG. 20 is a flowchart showing an example of a flow of an overall process performed by the information processing device 100 according to the present embodiment. Referring to FIG. 20, first, an annotation that should be displayed by the display control unit 165 (or a user via the user interface unit 170) is selected (Step S110). Next, the display control unit 165 acquires a 3D structure of a physical space (for example, a real object or a position and an attitude of a plane that is related to the selected annotation) recognized based on a SLAM arithmetic operation from the 3D structure DB 135 (Step S120). Next, the display control unit 165 disposes the selected annotation in an AR space in accordance with the 3D structure of the physical space (Step S130). Next, the conversion unit 140 calculates the display position of the annotation disposed in the AR space according to the above-described pinhole camera model (Step S140). Then, the display control unit 165 superimposes the selected annotation on an input image according to the calculation result of the conversion unit 140 (Step S150). As a result of the display control process, a display of an AR application as exemplified in FIGS. 1 and 2 can be realized.

[2-4. Conclusion of the First Embodiment]

According to the first embodiment, a normal vector of a horizontal plane in a physical space is recognized based on sensor data indicating the direction of gravity exerted on an imaging device, and using the recognized normal vector, a relative attitude of a plane such as the horizontal plane or a vertical plane with respect to an imaging plane is decided. Then, through coordinate conversion using the decided attitude of the plane, a state variable of the SLAM method is initialized. Generally, higher recognition accuracy is obtained in recognition of a vertical direction by a tri-axial acceleration sensor than in recognition of a horizontal plane based on image recognition. Thus, the state variable can be initialized with higher accuracy than when the state variable is initialized using the technique based on image recognition. Particularly, the recognition accuracy in the initialization of the SLAM method significantly affects accuracy in tracing a 3D structure of a physical space thereafter. For this reason, by initializing the state variable with higher accuracy, tracing of the 3D structure of the physical space thereafter can be performed more accurately as well.

In addition, according to the present embodiment, a relative position of a plane can be easily decided as a tentative position. For this reason, an annotation is not disposed so as to completely match a ground surface, a floor surface or the like of a physical space. In the present embodiment, however, since an attitude is secured at least with high accuracy, an annotation that is disposed along a plane or moves on the plane can be superimposed on an image in a natural form. Particularly, in an application in which a scale of an annotation is not considered significant, if an attitude of a plane can be decided accurately even though a relative position of a plane is decided inaccurately, an object of the application can be sufficiently achieved.

In addition, according to the present embodiment, parallax is not used as in the SfM method in deciding an attitude of a plane. For this reason, without moving the imaging device or even in a situation in which the imaging device is fixed, an attitude of a plane can be decided.

In addition, according to the present embodiment, an attitude of a horizontal plane can be easily and accurately decided using only sensor data from a tri-axial acceleration sensor. Furthermore, by using a restriction of a pre-defined direction, additional sensor data, or a user input, an attitude of a vertical plane can also be accurately decided. An attitude of an arbitrary plane can also be decided via a user interface. Thus, in many settings in which AR applications are used, the SLAM method can be initialized with high accuracy using various planes projected in an input image.

<3. Details of a Second Embodiment>

Adoption of the technology according to the present disclosure is also advantageous to an AR application that does not use the SLAM method. Thus, as a second embodiment, an information processing device 200 in which an AR application is installed not using the SLAM method will be described. Note that the information processing device 200 according to the present embodiment may be a terminal device as exemplified in FIG. 1, or may be a server device as exemplified in FIG. 2 like the information processing device 100 according to the first embodiment. When the information processing device 200 is a terminal device, the information processing device 200 can have a hardware configuration as exemplified in FIG. 3.

[3-1. Functional Configuration]

Figure 21:
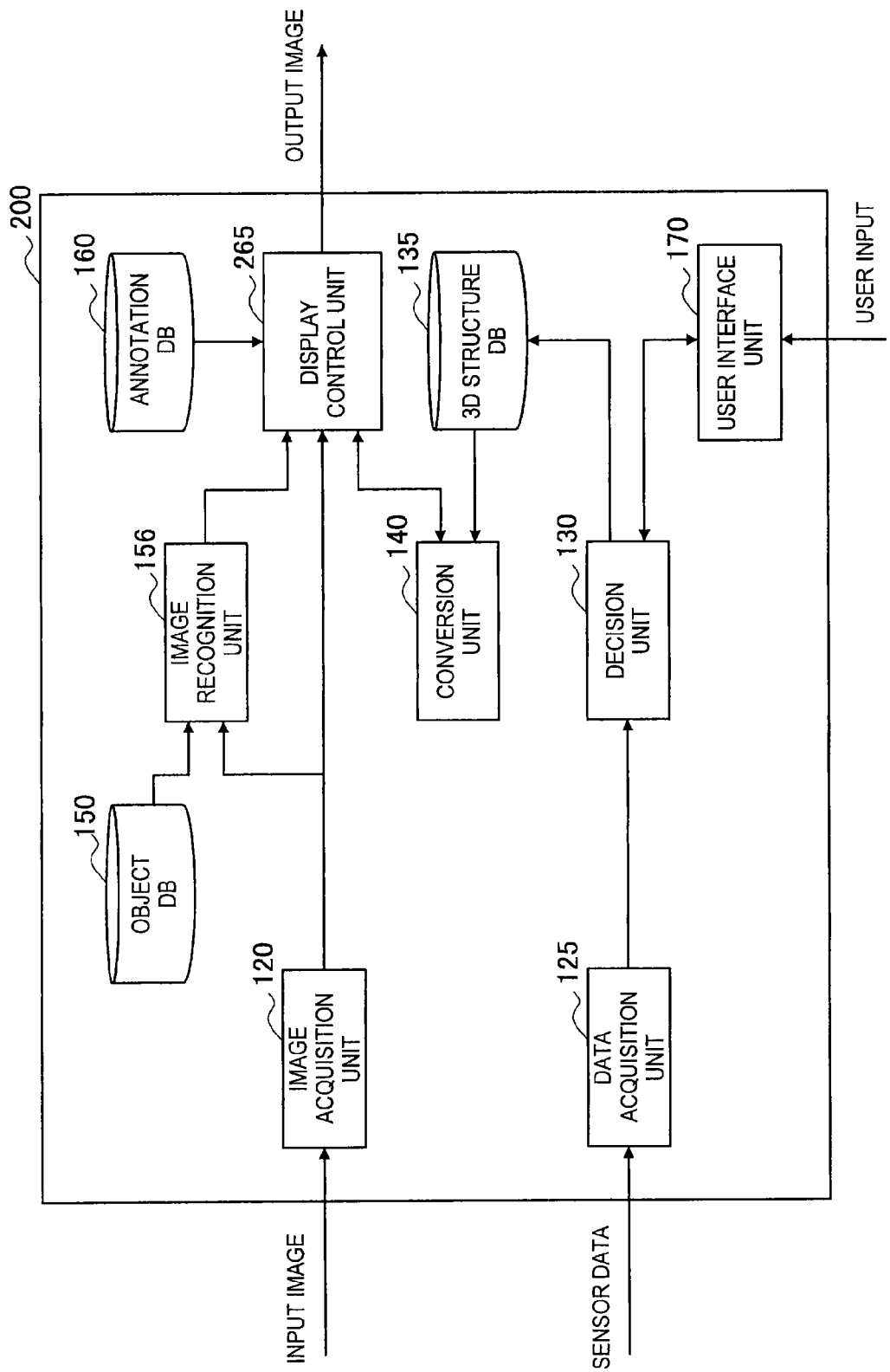
FIG. 21 is a block diagram showing an example of a configuration of logical functions of an information processing device according to a second embodiment.

FIG. 21 is a block diagram showing an example of a configuration of logical functions of the information processing device 200 according to the second embodiment. Referring to FIG. 21, the information processing device 200 includes the image acquisition unit 120, the data acquisition unit 125, the decision unit 130, the 3D structure DB 135, the conversion unit 140, the object DB 150, the image recognition unit 156, the annotation DB 160, the user interface unit 170, and a display control unit 265.

In the present embodiment, the decision unit 130 also decides a relative attitude of a plane (a horizontal plane, a vertical plane, or an arbitrary plane) of a physical space with respect to an imaging plane based on sensor data acquired by the data acquisition unit 125. Then, the decision unit 130 causes the 3D structure DB 135 to store a 3D structure of the plane having the decided attitude. The conversion unit 140 calculates two-dimensional positions in an image (in other words, on an imaging plane) corresponding to the three-dimensional positions of given points on the plane using the attitude of the plane decided by the decision unit 130. In the present embodiment, the given points that are subject to the calculation process performed by the conversion unit 140 are points constituting an annotation for an AR application. The image recognition unit 156 recognizes what object is projected in which part of an input image using feature data stored in the object DB 150. A result of the recognition by the image recognition unit 156 may be used at the time of selection and disposition of the annotation by the display control unit 265.

The display control unit 265 controls display of the AR application using a display. For example, the display control unit 265 disposes the annotation selected from the annotation DB 160 according to an object of the AR application in an AR space corresponding to the physical space projected in the input image. The disposition of the annotation may be decided according to the recognition result of the real object by the image recognition unit 156. Instead, the annotation may be disposed so as to be placed at, attached to, or posted on the plane decided by the decision unit 130. The conversion unit 140 calculates the two-dimensional positions on the imaging plane corresponding to feature points (or vertexes of a polygon or the like) constituting the annotation disposed in the AR space using positions and attitudes of the real object or the plane. The display control unit 265 superimposes the selected annotation on the input image according to the calculation result by the conversion unit 140.

[3-2. Process Flow]

Figure 22:
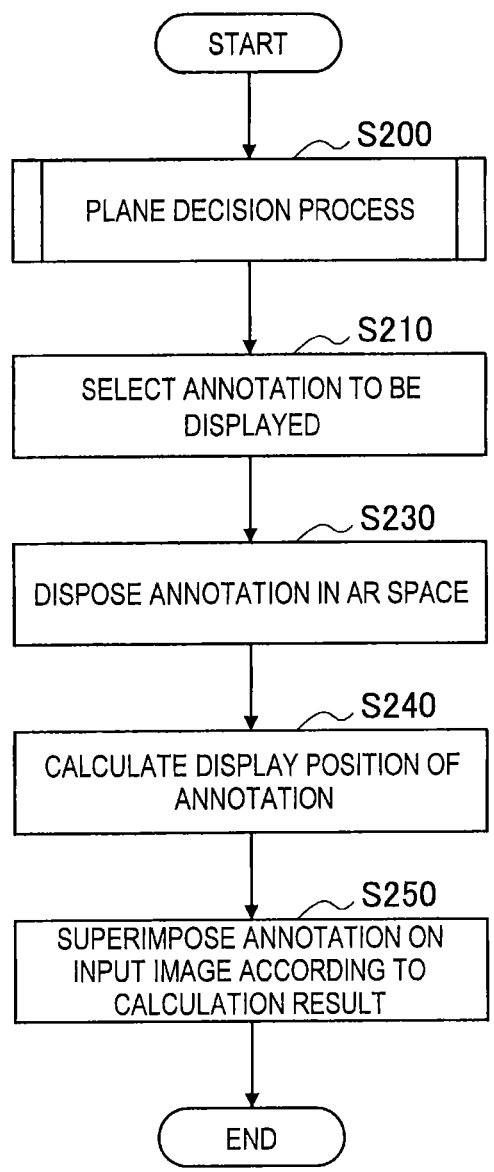
FIG. 22 is a flowchart showing an example of a flow of an overall process performed by the information processing device according to the second embodiment.

FIG. 22 is a flowchart showing an example of a flow of an overall process performed by the information processing device 100 according to the present embodiment. Referring to FIG. 22, first, the plane decision process by the decision unit 130 is performed (Step S200). Next, an annotation that should be displayed by the display control unit 265 is selected (Step S210). Next, the display control unit 265 disposes the selected annotation in the AR space (Step S230). As an example, the annotation can be disposed so as to be placed on a plane. Next, the conversion unit 140 calculates a display position of the annotation disposed in the AR space according to the above-described pinhole camera model (Step S240). Then, the display control unit 265 superimposes the selected annotation on an input image according to the calculation result of the conversion unit 140 (Step S250). As a result of the display control process described above, the display of the AR application as exemplified in FIGS. 1 and 2 can be realized.

[3-3. Conclusion of the Second Embodiment]

According to the present embodiment, based on sensor data indicating the direction of gravity exerted on the imaging device, a normal vector of a horizontal plane of a physical space is recognized, and using the recognized normal vector, a relative attitude of a plane such as the horizontal plane or a vertical plane with respect to an imaging plane is decided. Then, a display position of an annotation disposed in association with the decided plane is easily calculated using the attitude of the plane. As described above, generally, higher recognition accuracy is obtained in recognition of a vertical direction by a tri-axial acceleration sensor than in recognition of a horizontal plane based on image recognition. Thus, in comparison to a case in which an annotation is disposed in association with a plane recognized using the technique based on image recognition, a more natural annotation display can be realized in an AR application.

In addition, according to the present embodiment, an attitude of a horizontal plane can be easily and accurately decided using only sensor data from a tri-axial acceleration sensor. Furthermore, by using the pre-defined restriction of a direction, additional sensor data, or a user input, an attitude of a vertical plane can also be accurately decided. An attitude of an arbitrary plane can also be decided via a user interface. Thus, in many settings in which AR applications are used, an annotation can be naturally displayed in association with various planes projected in an input image.

<4. Adjustment of a Scale>

In the first and second embodiments, the plane decided by the decision unit 130 has a hypothetical scale. In other words, the value of the constant term D of the plane equation of the plane is a tentative value. The decision unit 130 may adjust the value of the constant term D so that the position of the plane matches a ground surface, a floor surface, a ceiling surface, a surface of a real object (a wall surface of a building) or the like. In addition, the decision unit 130 may adjust the value of the constant term D according to a condition of an AR application. In the present section, three techniques for adjusting a scale of a plane will be described using a horizontal plane as an example.

[4-1. First Technique]

In the first technique, a known size of a real object projected in an input image is used. For example, the difference of positions of two feature points that belong to one real object in three-dimensional shape data (refer to FIG. 19) included in feature data stored in the object DB 150 can be treated as the known size of the real object.

Figure 23:
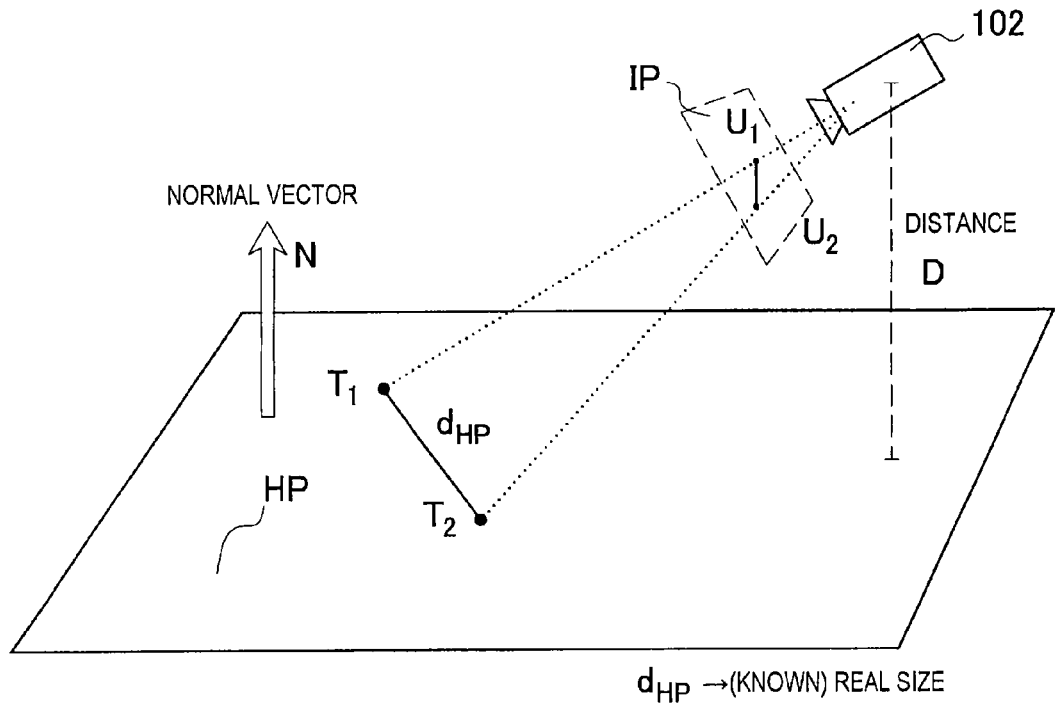
FIG. 23 is an illustrative diagram for describing a first technique for adjusting a scale of a plane.

FIG. 23 is an illustrative diagram for describing the first technique for deciding a scale of a plane. In FIG. 23, two feature points $T_1$ and $T_2$ are shown on the horizontal plane HP. The feature point $T_1$ corresponds to a position $U_1$ on the imaging plane IP and the feature point $T_2$ corresponds to a position $U_2$ on the imaging plane IP. The feature points $T_1$ and $T_2$ are assumed to belong to one real object. The image recognition unit 156 recognizes the real object that includes the feature points $T_1$ and $T_2$ from the input image. The decision unit 130 calculates the distance $d_{HP}$ between the feature points $T_1$ and $T_2$ from the three-dimensional shape data included in the feature data regarding the recognized real object. Then, the decision unit 130 sets the constant term D of the plane equation to be an unknown variable, and then elicits a value of D that causes the distance between feature points $T_1$ and $T_2$ to be $d_{HP}$.

[4-2. Second Technique]

In the second technique, data relating to the distance between the plane projected in the input image and the imaging device is used. For example, when the plane projected in the input image is a horizontal plane such as a ground surface or a floor surface, data relating to the height of the imaging device from the horizontal plane can be used. In addition, when the plane projected in the input image is a vertical plane such as a wall surface of a building, for example, the distance between the wall surface and the imaging device calculated from a map data can be used.

Figure 24:
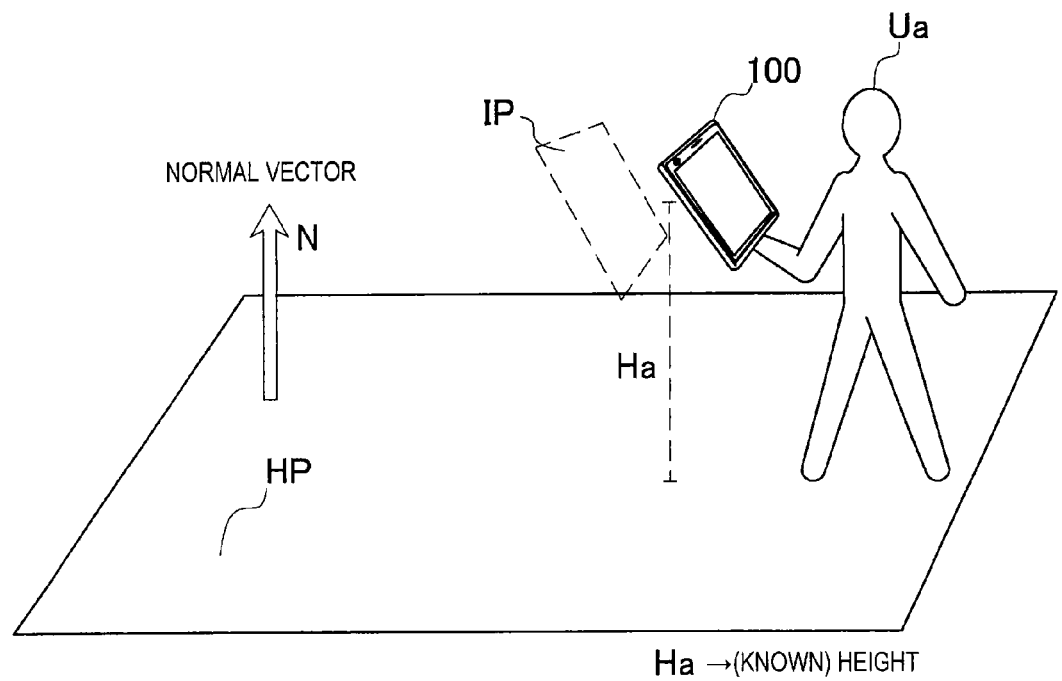
FIG. 24 is an illustrative diagram for describing a second technique for adjusting a scale of a plane.

FIG. 24 is an illustrative diagram for describing the second technique for deciding a scale of a plane. In FIG. 24, the user Ua standing on the horizontal plane HP and the information processing device 100 held by the user Ua are shown. Here, for example, the height of the user Ua is assumed to be stored in advance as known data or to be input to the information processing device 100 by the user Ua. The decision unit 130 estimates the height Ha of the imaging unit 102 of the information processing device 100 by multiplying the height of the user Ua by a certain rate. The decision unit 130 can use the estimated height Ha as the constant term D of the plane equation.

[4-3. Third Technique]

In the third technique, a display size of an annotation displayed to be superimposed on an input image is used. For example, a size of an annotation in a three-dimensional AR space is assumed to be defined in the annotation DB 160. In this case, if the size in terms of an imaging plane, i.e., the display size, of the annotation disposed on a plane is further specified, a scale of the plane can be decided based on the two sizes.

Figure 25:
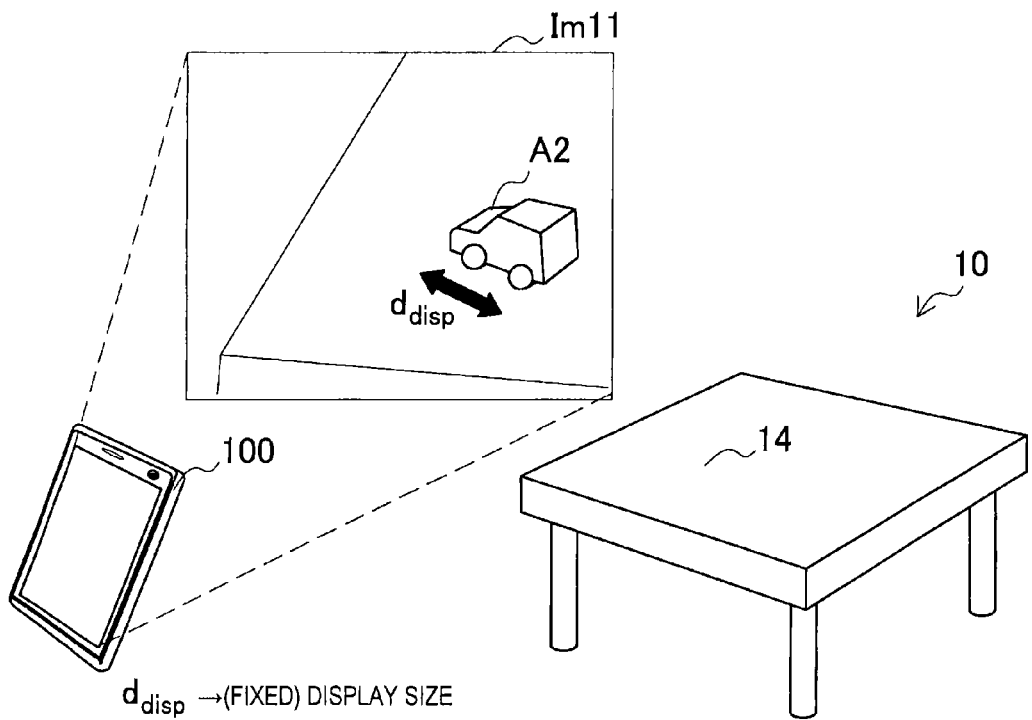
FIG. 25 is a first illustrative diagram for describing a third technique for adjusting a scale of a plane.

FIG. 25 is a first illustrative diagram for describing the third technique for deciding a scale of a plane. In FIG. 25, an image Im11 on which the table 14 present in the physical space is projected is shown. The annotation A2 is superimposed on the image Im11 as if it were placed on a surface of the table 14. Here, the AR application is assumed to display the annotation A2 in a display size $d_{disp}$ that is fixedly defined. In this case, the decision unit 130 decides the constant term D of the plane equation of the plane so that the annotation A2 disposed in the AR space has the display size $d_{disp}$ on the imaging plane. As a result, a display size of the annotation A2 disposed on the plane becomes the predetermined display size $d_{disp}$.

Figure 26:
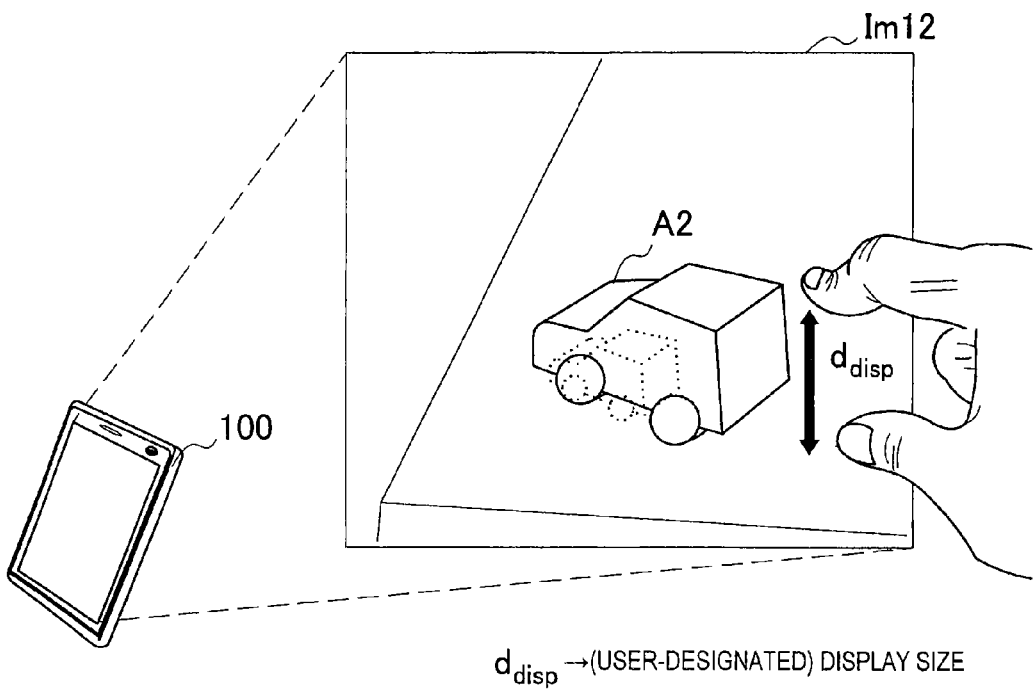
FIG. 26 is a second illustrative diagram for describing the third technique for adjusting a scale of a plane.

FIG. 26 is a second illustrative diagram for describing the third technique for deciding a scale of a plane. In FIG. 26, an image Im12 on which the annotation A2 is superimposed as if it were placed on the surface of the table is shown. The display size $d_{disp}$ of the annotation A2 is designated by a user via the user interface unit 170. In this case, the decision unit 130 also decides the constant term D of the plane equation of the plane so that the annotation A2 disposed in the AR space has the display size $d_{disp}$ on the imaging plane. As a result, a display size of the annotation A2 disposed on the plane becomes the designated display size $d_{disp}$.

According to the first technique or the second technique described above, a position of a plane can match a ground surface, a floor surface, a ceiling surface, a surface of a real object projected in an input image, and the like. Accordingly, annotations associated with such planes that actually exist can be naturally displayed. According to the third technique described above, annotations can be displayed in desired display sizes by adjusting a scale of a plane.

<5. Review>

Two embodiments of the technology according to the present disclosure have been described in detail above using FIGS. 1 to 26. According to the embodiments, in comparison to cases in which the technique based on image recognition is used, an attitude of a plane can be used for the AR technology by recognizing the attitude of the plane in a physical space with more accuracy.

Note that the technology according to the present disclosure may be applied to various usages of, for example, displaying a horizontal plane and a vertical plane at the time of positioning the imaging device, adding a mark indicating a horizontal plane or a vertical plane to a recorded image, or the like in addition to usages relating to AP applications.

In addition, a part of the logical functions of the information processing device 100 or 200 described above may be installed in a device present in a cloud computing environment, instead of being installed in the devices. In such a case, information exchanged between the logical functions can be transmitted or received between devices via the communication unit 112 shown in FIG. 3.

The series of control processes carried out by each apparatus described in the present specification may be realized by software, hardware, or a combination of software and hardware. Programs that are included in such software may be stored in advance for example on a storage medium provided inside or outside each of the apparatus. As one example, during execution, such programs are written into RAM (Random Access Memory) and executed by a processor such as a CPU.

Although preferred embodiments of the present disclosure are described in detail above with reference to the appended drawings, the technical scope of the disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An information processing device including:

a data acquisition unit configured to acquire sensor data indicating the direction of gravity exerted on an imaging device configured to image an image in which a physical space is projected;

a decision unit configured to decide a relative attitude of a plane in the physical space with respect to the image based on the sensor data; and a conversion unit configured to perform conversion between a three-dimensional position of a given point on the plane and a two-dimensional position in the corresponding image using the attitude decided by the decision unit.

(2)

The information processing device according to (1), wherein the given point on the plane is a feature point selected at a time of initialization of a simultaneous localization and mapping (SLAM) method.

(3)

The information processing device according to (1), wherein the given point on the plane is a point constituting an annotation for augmented reality.

(4)

The information processing device according to (3), wherein the decision unit decides a hypothetical plane having the attitude decided based on the sensor data and a tentative position, wherein the information processing device further includes a display control unit configured to superimpose the annotation on the image, and wherein the annotation is superimposed at a two-dimensional position in the image converted by the conversion unit from a three-dimensional position on the hypothetical plane.

(5)

The information processing device according to (2) or (3), further including:

a recognition unit configured to recognize an object projected in the image, wherein the decision unit further decides a position of the plane projected in the image using known data of a real size of the object recognized by the recognition unit.

(6)

The information processing device according to any one of (1) to (3), wherein the decision unit further decides a position of the plane using data relating to the distance between the plane projected in the image and the imaging device.

(7)

The information processing device according to (3), wherein the decision unit further decides a position of the plane in which the annotation is to be disposed using a display size of the annotation to be displayed.

(8)

The information processing device according to (7), further including:

a user interface unit configured to enable a user to designate the display size.

(9)

The information processing device according to any one of (1) to (8), wherein the plane is a horizontal plane, and wherein the decision unit determines whether the imaging device faces an upper direction or a lower direction based on the sensor data, and decides the attitude of the horizontal plane according to a result of the determination.

(10)

The information processing device according to any one of (1) to (8), wherein the plane is a vertical plane, and wherein the decision unit decides an attitude of the vertical plane based on the sensor data indicating the direction of gravity and a restriction of a pre-defined direction.

(11)

The information processing device according to any one of (1) to (8), wherein the plane is a vertical plane, and wherein the decision unit decides an attitude of the vertical plane based on the sensor data indicating the direction of gravity and map data indicating the positional relationship between the imaging device and the vertical plane.

(12)

The information processing device according to (11), wherein the decision unit estimates a vertical plane projected in the image using sensor data indicating a direction of geomagnetism from one or more vertical plane candidates included in the map data, and decides an attitude of the estimated vertical plane based on the map data and the direction of gravity.

(13)

The information processing device according to (11), wherein the decision unit decides an attitude of the vertical plane designated by a user from one or more vertical plane candidates included in the map data based on the map data and the direction of gravity.

(14)

The information processing device according to any one of (1) to (8), further including:

a user interface unit configured to dispose a user interface that enables a user to designate an attitude of the plane in an augmented reality space with reference to an attitude of a horizontal plane or a vertical plane decided based on the sensor data.

(15)

The information processing device according to (14), wherein the disposition of the user interface is maintained in the augmented reality space over a plurality of frames.

(16)

The information processing device according to (15), wherein the user interface has an operation plane configured to be three-dimensionally rotation-operable, and wherein the decision unit decides an attitude of the plane using an attitude of the operation plane operated by a user so as to be in parallel with the plane.

(17)

The information processing device according to any one of (1) to (16), wherein the information processing device is a terminal device configured to further have the imaging device and a sensor configured to output the sensor data.

(18)

The information processing device according to any one of (1) to (17), wherein at least one of the data acquisition unit, the decision unit, and the conversion unit is installed in a device present in a cloud computing environment instead of in the information processing device.

(19)

An information processing method of a computer configured to control an information processing device, the method including:

acquiring sensor data indicating the direction of gravity exerted on an imaging device configured to image an image in which a physical space is projected;

deciding a relative attitude of a plane in the physical space with respect to the image based on the sensor data; and performing conversion between a three-dimensional position of a given point on the plane and a two-dimensional position in the corresponding image using the decided attitude.

(20)

A program causing a computer configured to control an information processing device to function as:

a data acquisition unit configured to acquire sensor data indicating the direction of gravity exerted on an imaging device configured to image an image in which a physical space is projected;

a decision unit configured to decide a relative attitude of a plane in the physical space with respect to the image based on the sensor data; and a conversion unit configured to perform conversion between a three-dimensional position of a given point on the plane and a two-dimensional position in the corresponding image using the attitude decided by the decision unit.

REFERENCE SIGNS LIST 100, 200 information processing device
102 imaging unit
104 sensor unit
125 data acquisition unit 130 decision unit
140 conversion unit
156 recognition unit
165, 265 display control unit
170 user interface unit
HP horizontal plane
IP imaging plane

The invention claimed is:

1. An information processing device comprising:
a data acquisition unit configured to acquire sensor data indicating the direction of gravity exerted on an imaging device configured to image an image in which a physical space is projected;
a decision unit configured to decide a relative attitude of a plane in the physical space with respect to the image based on the sensor data; and
a conversion unit configured to perform conversion between a three-dimensional position of a given point on the plane and a two-dimensional position in the image using the attitude decided by the decision unit,
wherein in an event the plane is a vertical plane, the decision unit is configured to decide an attitude of the vertical plane based on the sensor data indicating the direction of gravity and map data indicating the positional relationship between the imaging device and the vertical plane.

2. The information processing device according to claim 1, wherein the given point on the plane is a feature point selected at a time of initialization of a simultaneous localization and mapping (SLAM) method.

3. The information processing device according to claim 2, further comprising:
a recognition unit configured to recognize an object projected in the image,
wherein the decision unit is further configured to decide a position of the plane in the physical space using known data of a real size of the object recognized by the recognition unit.

4. The information processing device according to claim 1, wherein the given point on the plane is a point constituting an annotation for augmented reality.

5. The information processing device according to claim 3, wherein the decision unit is configured to decide a hypothetical plane having the attitude decided based on the sensor data and a tentative position,
wherein the information processing device further includes a display control unit configured to superimpose the annotation on the image, and
wherein the annotation is superimposed at a two-dimensional position in the image converted by the conversion unit from a three-dimensional position on the hypothetical plane.

6. The information processing device according to claim 4, wherein the decision unit is further configured to decide a position of the plane in which the annotation is to be disposed using a display size of the annotation to be displayed.

7. The information processing device according to claim 6, further comprising:
a user interface unit configured to enable a user to designate the display size.

8. The information processing device according to claim 1, wherein the decision unit is further configured to decide a position of the plane using data relating to the distance between the plane in the physical space which is projected in the image and the imaging device.

9. The information processing device according to claim 1, wherein in an event the plane is a horizontal plane,
the decision unit is configured to determine whether the imaging device faces an upper direction or a lower direction based on the sensor data, and decide the attitude of the horizontal plane according to a result of the determination.

10. The information processing device according to claim 1,
wherein in an event the plane is a vertical plane,
the decision unit is configured to, alternatively, decide the attitude of the vertical plane based on the sensor data indicating the direction of gravity and a restriction of a pre-defined direction.

11. The information processing device according to claim 1, wherein the decision unit is configured to estimate a vertical plane projected in the image using sensor data indicating a direction of geomagnetism from one or more vertical plane candidates included in the map data, and decide an attitude of the estimated vertical plane based on the map data and the direction of gravity.

12. The information processing device according to claim 1, wherein the decision unit is configured to decide an attitude of the vertical plane designated by a user from one or more vertical plane candidates included in the map data based on the map data and the direction of gravity.

13. The information processing device according to claim 1, further comprising:
a user interface unit configured to dispose a user interface that enables a user to designate an attitude of the plane in an augmented reality space with reference to an attitude of a horizontal plane or the attitude of the vertical plane decided based on the sensor data.

14. The information processing device according to claim 13, wherein the disposition of the user interface is maintained in the augmented reality space over a plurality of frames.

15. The information processing device according to claim 14,
wherein the user interface has an operation plane configured to be three-dimensionally rotation-operable, and
wherein the decision unit is configured to decide an attitude of the plane using an attitude of the operation plane operated by the user so as to be in parallel with the plane.

16. The information processing device according to claim 1, wherein the information processing device is a terminal device configured to further have the imaging device and a sensor configured to output the sensor data.

17. The information processing device according to claim 1, wherein at least one of the data acquisition unit, the decision unit, and the conversion unit is installed in a device present in a cloud computing environment instead of in the information processing device.

18. An information processing method of a computer configured to control an information processing device, the method comprising:
acquiring sensor data indicating the direction of gravity exerted on an imaging device configured to image an image in which a physical space is projected;
deciding a relative attitude of a plane in the physical space with respect to the image based on the sensor data; and
performing conversion between a three-dimensional position of a given point on the plane and a two-dimensional position in the image using the decided attitude,
wherein in an event of a vertical plane, an attitude of the vertical plane is decided based on the sensor data indicating the direction of gravity and map data indicating the positional relationship between the imaging device and the vertical plane.

19. A non-transitory computer-readable storage medium having stored thereon, a set of computer-executable instructions for causing a computer to function as:
- a data acquisition unit configured to acquire sensor data indicating the direction of gravity exerted on an imaging device configured to image an image in which a physical space is projected;
- a decision unit configured to decide a relative attitude of a plane in the physical space with respect to the image based on the sensor data; and
- a conversion unit configured to perform conversion between a three-dimensional position of a given point on the plane and a two-dimensional position in the image using the attitude decided by the decision unit,
- wherein in an event of a vertical plane, the decision unit is configured to decide an attitude of the vertical plane based on the sensor data indicating the direction of gravity and map data indicating the positional relationship between the imaging device and the vertical plane.

* * * * *